US009274551B2

(12) United States Patent
Su et al.

(10) Patent No.: US 9,274,551 B2
(45) Date of Patent: Mar. 1, 2016

(54) METHOD AND APPARATUS FOR DATA ENTRY INPUT

(75) Inventors: Wei Ling Su, Hoffman Estates, IL (US); Dong Ge Li, Hoffman Estates, IL (US); Joseph Zlotnicki, Downers Grove, IL (US)

(73) Assignee: Zienon, LLC, Brentwood, CA (US)

( * ) Notice: Subject to any disclaimer, the term of this patent is extended or adjusted under 35 U.S.C. 154(b) by 2025 days.

(21) Appl. No.: 11/361,858

(22) Filed: Feb. 23, 2006

(65) Prior Publication Data

US 2006/0190836 A1 Aug. 24, 2006

Related U.S. Application Data

(60) Provisional application No. 60/655,469, filed on Feb. 23, 2005.

(51) Int. Cl.
*G06F 1/16* (2006.01)
*G06F 3/023* (2006.01)
*G06F 3/041* (2006.01)
(Continued)

(52) U.S. Cl.
CPC ............ *G06F 1/1616* (2013.01); *G06F 1/1624* (2013.01); *G06F 1/1662* (2013.01); *G06F 1/1673* (2013.01); *G06F 3/0233* (2013.01); *G06F 3/0235* (2013.01); *G06F 3/0237* (2013.01); *G06F 3/0416* (2013.01); *G06F 3/0418* (2013.01); *G06F 3/0426* (2013.01); *G06F 3/0428* (2013.01); *G06F 3/04883* (2013.01); *G06F 3/04886* (2013.01)

(58) Field of Classification Search
USPC .......................................... 345/169, 168, 172
See application file for complete search history.

(56) References Cited

U.S. PATENT DOCUMENTS 4,988,981 A   1/1991   Zimmerman et al.
5,025,705 A   6/1991   Raskin
(Continued)

FOREIGN PATENT DOCUMENTS

EP    0489792 B1   3/1994
WO    96/02394     2/1996
(Continued)

OTHER PUBLICATIONS

MacKenzi, I.S., & Soukoreff, R.W. (2002); Text Entry for Mobile Computing: Model and Methods, Theory and Practice. Human Computer Interaction, 17, 147-198.
(Continued)

*Primary Examiner* — William Boddie
*Assistant Examiner* — Leonid Shapiro
(74) *Attorney, Agent, or Firm* — Joseph A. Fuchs; Nixon Peabody LLP

(57) ABSTRACT

An apparatus and method of inputting data for an electronic data entry device are provided. In one embodiment, main keys on a keyboard of a device are used in which the main keys have multiple symbols or functions associated therewith, and one or more assisting keys of the device are used to select between the symbols or functions on the main keys. In a further embodiment, identification of an input object such as the particular fingers of a user that are used to actuate a key region is performed. The symbol associated with the actuated key region and the finger (or other input object) used is determined. Various types of sensors and recognition technology are implemented in order to identify fingers (or other input objects) in various embodiments.

41 Claims, 10 Drawing Sheets

(51) Int. Cl.
*G06F 3/042* (2006.01)
*G06F 3/0488* (2013.01)

(56) References Cited

U.S. PATENT DOCUMENTS

| | | | |
|---|---|---|---|
| 5,168,531 A | 12/1992 | Sigel | |
| 5,245,559 A | 9/1993 | Lapeyre | |
| 5,581,484 A | 12/1996 | Prince | |
| 5,767,842 A | 6/1998 | Korth | |
| 5,790,103 A * | 8/1998 | Willner | 345/168 |
| 5,793,312 A * | 8/1998 | Tsubai | 341/22 |
| 5,825,352 A | 10/1998 | Bisset et al. | |
| 5,841,374 A | 11/1998 | Abraham | |
| 5,973,621 A | 10/1999 | Levy | |
| 5,982,302 A | 11/1999 | Ure | |
| 6,011,554 A | 1/2000 | King et al. | |
| 6,087,577 A | 7/2000 | Yahata et al. | |
| 6,102,594 A | 8/2000 | Str.o slashed.m | |
| 6,204,848 B1 | 3/2001 | Nowlan et al. | |
| 6,208,330 B1 | 3/2001 | Hasegawa et al. | |
| 6,232,960 B1 | 5/2001 | Goldman | |
| 6,307,549 B1 | 10/2001 | King et al. | |
| 6,348,878 B1 * | 2/2002 | Tsubai | 341/23 |
| 6,356,258 B1 | 3/2002 | Kato et al. | |
| 6,407,679 B1 | 6/2002 | Evans et al. | |
| 6,512,838 B1 | 1/2003 | Rafii et al. | |
| 6,542,091 B1 | 4/2003 | Rasanen | |
| 6,593,914 B1 | 7/2003 | Nuovo et al. | |
| 6,611,252 B1 | 8/2003 | DuFaux | |
| 6,611,253 B1 | 8/2003 | Cohen | |
| 6,614,422 B1 | 9/2003 | Rafii et al. | |
| 6,654,484 B2 | 11/2003 | Topping | |
| 6,670,894 B2 | 12/2003 | Mehring | |
| 6,690,618 B2 | 2/2004 | Tomasi et al. | |
| 6,710,770 B2 | 3/2004 | Tomasi et al. | |
| 6,885,317 B1 | 4/2005 | Gutowitz | |
| 7,016,711 B2 | 3/2006 | Kurakane | |
| 7,020,270 B1 | 3/2006 | Ghassabian | |
| 7,088,340 B2 | 8/2006 | Kato | |
| 7,151,530 B2 | 12/2006 | Roeber et al. | |
| 7,199,786 B2 | 4/2007 | Suraqui | |
| 7,439,957 B2 * | 10/2008 | Chu et al. | 345/169 |
| 7,530,031 B2 | 5/2009 | Iwamura et al. | |
| 7,555,732 B2 * | 6/2009 | Van der Hoeven | 715/863 |
| 7,725,511 B2 | 5/2010 | Kadi | |
| RE43,082 E | 1/2012 | Gutowitz | |
| 2002/0021287 A1 * | 2/2002 | Tomasi et al. | 345/168 |
| 2002/0140582 A1 | 10/2002 | Ye | |
| 2002/0163506 A1 | 11/2002 | Matusis | |
| 2002/0171633 A1 | 11/2002 | Brinjes | |
| 2002/0180698 A1 | 12/2002 | Kaelbling | |
| 2003/0043118 A1 | 3/2003 | Lee | |
| 2003/0048260 A1 | 3/2003 | Matusis | |
| 2003/0063775 A1 | 4/2003 | Rafii et al. | |
| 2003/0179185 A1 | 9/2003 | Iwamura et al. | |
| 2004/0032398 A1 | 2/2004 | Ariel et al. | |
| 2004/0046744 A1 | 3/2004 | Rafii et al. | |
| 2004/0169635 A1 | 9/2004 | Ghassabian | |
| 2004/0179001 A1 | 9/2004 | Morrison et al. | |
| 2004/0196268 A1 | 10/2004 | Hsu et al. | |
| 2004/0242988 A1 | 12/2004 | Niwa et al. | |
| 2004/0263473 A1 | 12/2004 | Cho et al. | |
| 2005/0024338 A1 | 2/2005 | Ye | |
| 2005/0162402 A1 | 7/2005 | Watanachote | |
| 2005/0225538 A1 | 10/2005 | Verhaegh | |
| 2005/0253814 A1 | 11/2005 | Ghassabian | |
| 2006/0028358 A1 * | 2/2006 | Bollman | 341/22 |
| 2006/0028450 A1 | 2/2006 | Suraqui | |
| 2006/0114233 A1 | 6/2006 | Radivojevic et al. | |
| 2006/0132447 A1 | 6/2006 | Conrad | |
| 2006/0190836 A1 | 8/2006 | Ling Su et al. | |
| 2006/0282791 A1 | 12/2006 | Bogomolov et al. | |
| 2007/0035521 A1 | 2/2007 | Jui et al. | |
| 2008/0300010 A1 | 12/2008 | Border et al. | |
| 2009/0183098 A1 | 7/2009 | Casparian et al. | |
| 2009/0237361 A1 | 9/2009 | Mosby et al. | |
| 2010/0231522 A1 | 9/2010 | Li | |

FOREIGN PATENT DOCUMENTS

| | | |
|---|---|---|
| WO | 01/59558 | 8/2001 |
| WO | 01/59975 | 8/2001 |
| WO | 02/10896 | 2/2002 |
| WO | 03/046706 | 6/2003 |
| WO | 03/050795 | 6/2003 |
| WO | 2009/0594479 | 5/2009 |

OTHER PUBLICATIONS

Roos, Gina, Fingerprint Sensor Touts Security, Navigation, and Personalization for Cell Phones Nov. 2004.

* cited by examiner

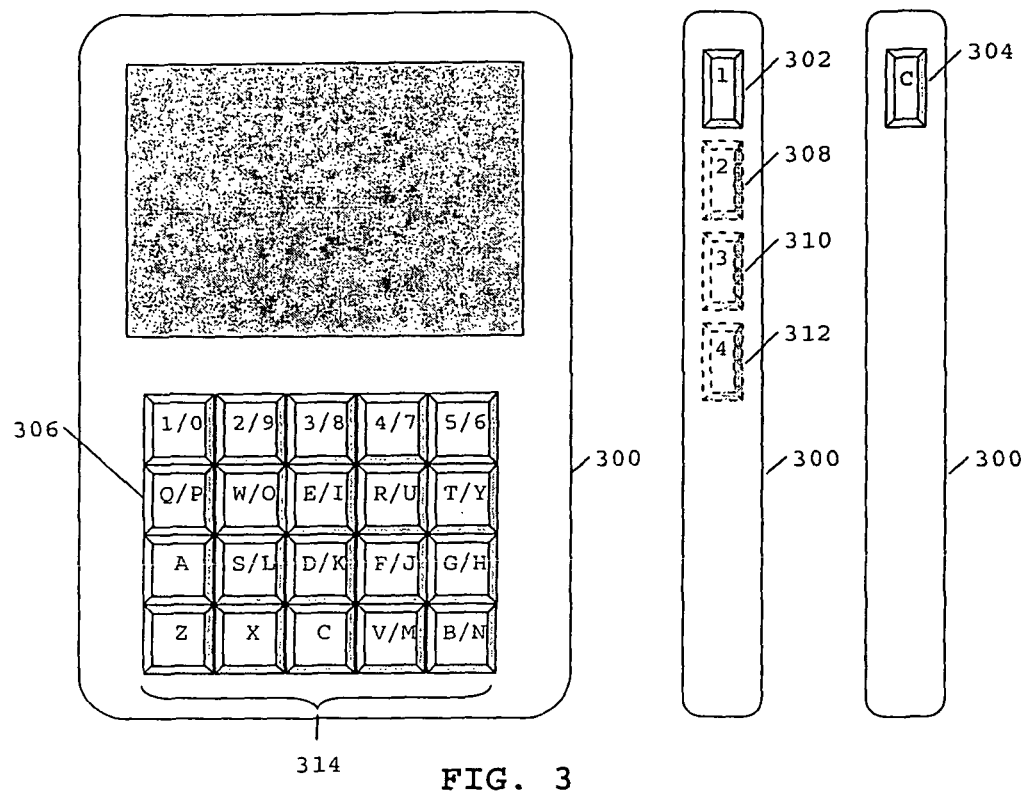
FIG. 3
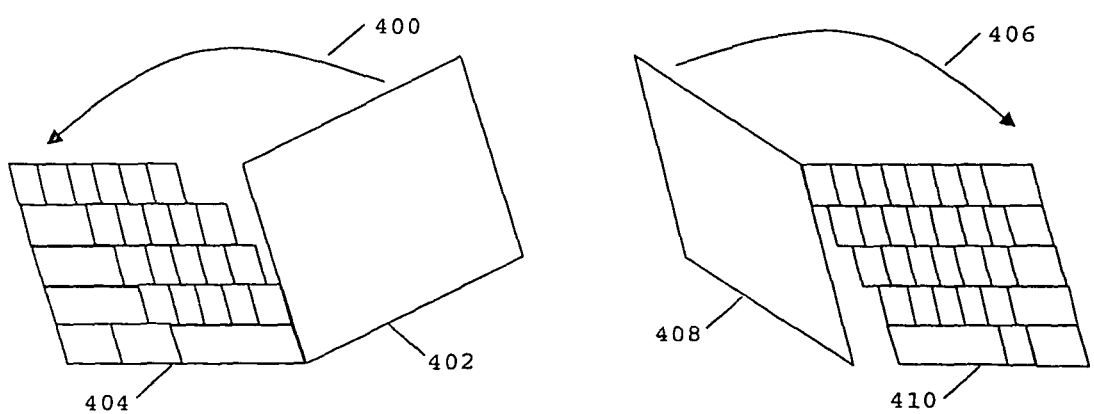
FIG. 4A
FIG. 4B

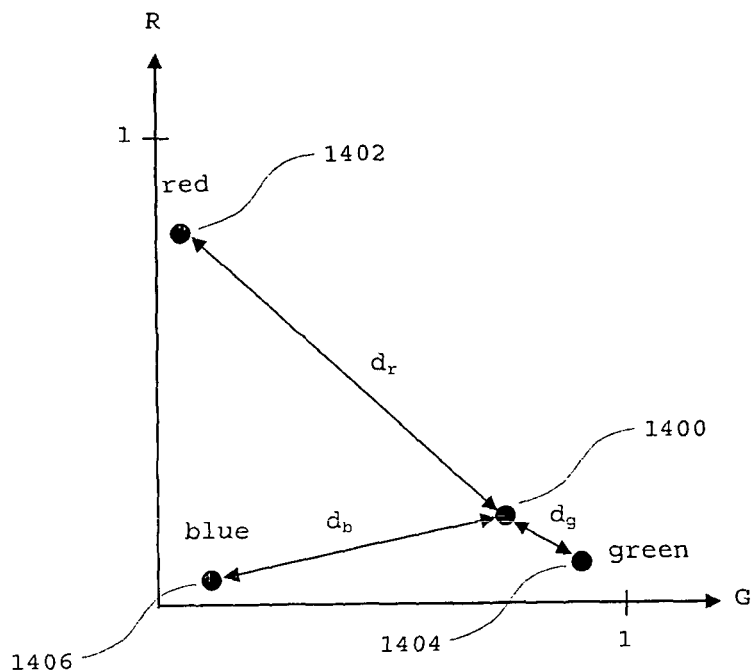
FIG. 14
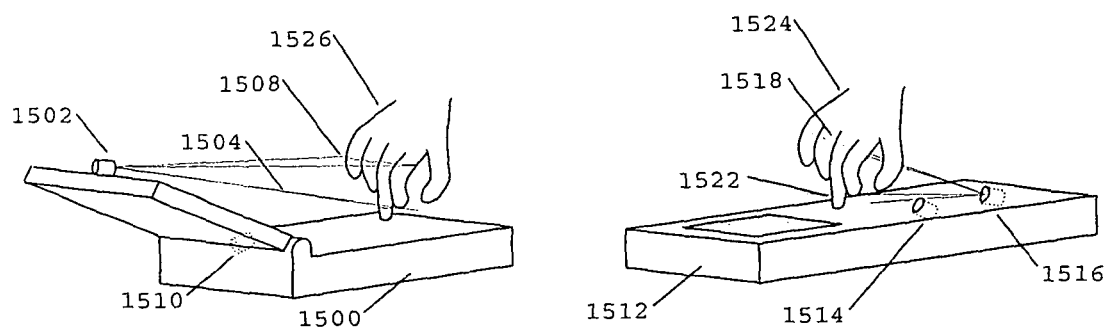
FIG. 15A                    FIG. 15B

METHOD AND APPARATUS FOR DATA ENTRY INPUT

CROSS REFERENCE TO RELATED APPLICATION

This application claims priority to U.S. provisional patent application Ser. No. 60/655,469, filed on Feb. 23, 2005, the disclosure of which is incorporated by reference herein in its entirety.

FIELD OF THE INVENTION

The present invention relates in general to the field of data entry, and in particular, to methods and apparatus for user input in a device.

BACKGROUND OF THE INVENTION

Today, computers of various kinds have reached nearly every corner of people's lives. Computer-based technology is found in cars, televisions, telephones and even watches. With computers becoming increasingly portable, powerful, and affordable, the technology has made mobile computing a more common occurrence. As a result, more microprocessor-based computing units incorporated in various compact data entry devices have been developed.

In office environments, input to electronic data entry devices, such as personal computers, through a known QWERTY keyboard is a common occurrence. However, QWERTY keyboards are not well suited for many non-office environments or mobile use cases, since they are too large in size and require additional support to free both hands for operation.

Several alternative input methods for mobile applications have been proposed. For instance, the use of mini-keyboards have been proposed, some of which can even be folded to reduce physical size and, thus, increase portability. These mini-keyboards, however, can be inefficient and are difficult to use in many typing scenarios as the keys are often quite tiny and are tightly packed together.

The use of different keyboard layouts to reduce keyboard size has also been considered. One keyboard having as few as twelve keys has been suggested with the keys representing up to 144 characters/functions using combinations of multiple keystrokes. Alternative attempts include different layouts to fit the most frequently used keys into portable devices such as wireless mobile telephones. However, such unconventional keyboards are often difficult to learn and use. Since most people first learn to type on the QWERTY or telephone-style keyboards, their instincts tend to favor their initial training, making it difficult for them to re-learn something which deviates drastically from such initial training.

Voice recognition and handwriting recognition approaches have attempted to provide alternatives to conventional data entry in certain applications. Handwriting input approaches are often substantially slower than conventional typing, while voice input approaches still face many challenges due to background noise and other factors. In addition, the use of voice recognition systems in many situations can be disturbing to the public and also often lacks privacy.

One type of input device known as a 'virtual keyboard' operates by projecting a full-size QWERTY keyboard layout on a flat surface and also allows users to type on it. Such devices require a separate support surface and also take up considerable space during operation as a traditional full-size keyboard is displayed requiring both hands of a user to efficiently type data into the device. Thus, such virtual keyboards are not always well suited for the mobile environment.

BRIEF DESCRIPTION OF THE DRAWINGS

FIG. 3 illustrates an alternative example of a data entry device having a left-handed, folded QWERTY layout of main keys in the front and one or more assisting keys on a side of the device.

FIGS. 4A and 4B illustrate derivations of folded QWERTY layouts from a conventional keyboard.

FIG. 14 illustrates an exemplary mapping of artificial colors as may be applied to associated actuating fingers of a user.

FIG. 15A depicts one example of a data entry device that utilizes active sensors for actuating finger identification.

FIG. 15B depicts another example of a data entry device that utilizes active sensors for actuating finger identification.

DETAILED DESCRIPTION

Figure 1:
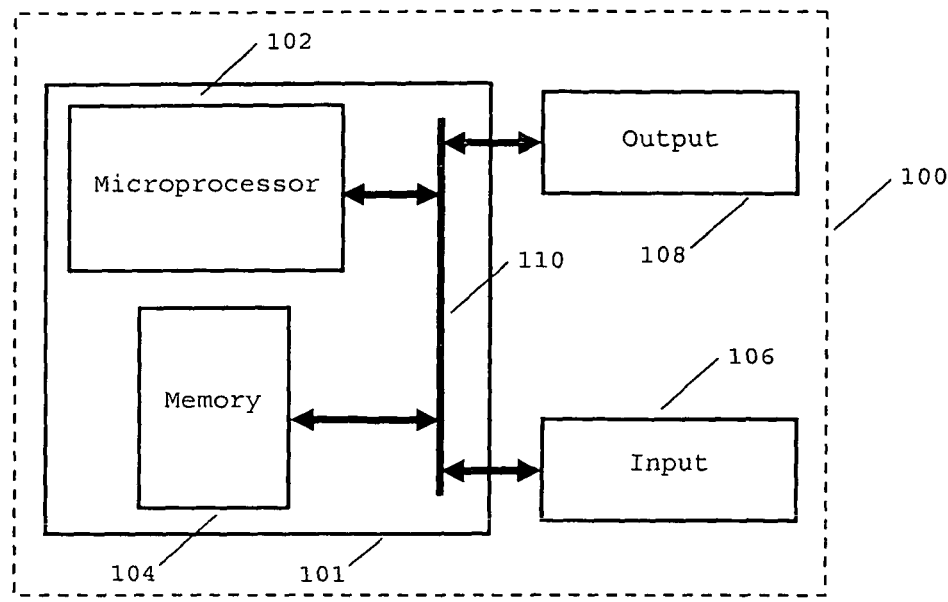
FIG. 1 is a functional block diagram illustrating components relating to one example of a data entry device.

A method and apparatus for efficient user input with a data entry device are provided. Various examples of implementation are provided. Methods and apparatus for selecting individual symbols or functions within a multi-symbol main key region based on an identified input object, such as an actuating finger, are provided. Also, methods and apparatus based on telephone-style and QWERTY keyboard layouts are provided. Such layouts make use of assisting keys that facilitate the selection of individual symbols or functions within a main key capable of inputting multiple symbols or functions. Main keys may also be referred to hereafter as multi-symbol main keys. Assisting keys are assigned to correspond to symbols in a multi-symbol main key in a manner such that a symbol or function may be selected using a combination of main key and assisting key keystrokes. Such keystroke combinations may be comprised of keys actuated simultaneously or in sequence, with at most two keystrokes needed to input each symbol. The selection of individual symbols or functions within a multi-symbol main key may be further based on a combination of an identified input object and an assisting key keystroke.

Generally, stated, a method and apparatus for determining a user inputted symbol or function are provided. A computer-implemented data entry device having an associated memory adapted to store information associating symbols or functions with corresponding key regions of the data entry device is provided. The symbols or functions associated with individual key regions, are assigned, in memory, to corresponding input objects. The key regions of the data entry device may be of various types such as keys of a keyboard, touch-sensitive regions, virtual key regions having pre-assigned regions in two-dimensional space, or virtual key regions having the assigned regions is three-dimensional space. An input object may be any object that is capable of being used to tap or actuate a key region, for example: one or more fingers of a hand of a user, a portion of a finger, an actuating device (such as a stylus or tablet pen), or part of an actuating device. The computer-implemented data entry device has a processor (such as a microprocessor) adapted to: determine which key region has been actuated, identify the input object associated with the actuation of the key region, and output an associated symbol or perform an associated function in response to the identification of the input object that actuated the key region.

In one example, the input object identified may be a finger (or fingers) of a hand of a user. The apparatus associated with the data entry device may utilize one or more sensors to detect finger features such as: size, shape in two or three-dimensional space, edge, vein pattern, nail color, skin texture, skin tone, area of contact with actuated key region, pressure or impact of contact with actuated key region, sound of contact with actuated key region, impedance, conductance, capacitance, inductance, infrared properties, ultrasound properties, thermal properties, fingerprint, or a derivative of one or more of the finger features. Alternatively, one or more non-finger input objects (such as a stylus or tablet pen or other actuating devices or objects that differ from the fingers of a user) may be identified as actuating a key region. A single sensor or multiple sensors may be used to detect various object features such as: size, shape in two- or three-dimensional space, edge, color, surface texture, area of contact with actuated key region, pressure or impact of contact with actuated key region, sound of contact with actuated key region impedance, conductance, capacitance, inductance, infrared properties, ultrasound properties, thermal properties, and a derivative of one or more of the object features.

In one particular embodiment, disclosed herein, the data entry device utilizes at least one sensor to perform a sample capture in which the sample contains a feature for the identification of the input object. The computer-implemented data entry device is adapted to perform a pre-processing operation on the captured sample and extract at least one feature of the input object from the captured sample. The computer-implemented data entry device identifies the input object actuating the key region via identification of the extracted feature and selects the symbol or function corresponding to the input object identified as actuating the key region.

In another example, the data entry device memory is adapted to store information assigning the symbols or functions associated with the individual key regions to corresponding identifiable differentiating objects that are placeable on an input object. Identifiable differentiating objects are objects which possess at least one feature, such as color, surface texture, shape, and the like, that could be detected and used to identify the objects. If the input object includes one or more fingers of a user, examples of identifiable differentiating objects may include: sensors, gloves, rings, switches, tags, or a derivation thereof. The computer-implemented data entry device is adapted to identify the input object that actuated the key region via identification of an identifiable differentiating object placed on the input object. The corresponding symbol is outputted or the corresponding function is performed in response to the identification of the input object used to actuate the key region.

As is provided herein, sensors coupled with the processor of the data entry device may be utilized to identify the input object actuating a key region. Various sensors may selectively be employed such as: contact sensors, contactless sensors, active sensors, or hybrid sensors of two or more of these sensors. For example, an active sensor may be used to detect the input object by projecting reference signals (such as electromagnetic wave signals or ultrasound signals) onto the input object and detecting feedback from the projected reference signals.

The memory of the computer-implemented data entry device may also be adapted to store information assigning the symbols or functions (associated with the key regions) to corresponding identifiable differentiating parts of the input objects. Identifiable differentiating object parts are portions of input objects which possess at least one feature, such as color, surface texture, shape, and the like, that could be detected and used to identify that portion of the input objects. The data entry device identifies the part of an input object that was used in actuating the key region and outputs a symbol or performs a function in response to the identification of the input object part. Alternatively, information is stored in memory assigning the key region symbols or functions to corresponding user-configured alterable features exhibited by the input objects. User-configured alterable features exhibited by an input object are variable features of an object that may change based on some user configuration. For example, a small screen on a stylus may show different colors depending on which button on the stylus a user presses. The computer-implemented data entry device identifies a feature exhibited by the input object while being used in actuating a key region and also outputs the symbol or performs the function in response to the identification of the feature exhibited by the input object.

FIG. 1 is a functional block diagram illustrating components relating to portions of one example of a computer-implemented data entry device 100. As part of the data entry device 100, a computer-implemented system 101 is provided having a processor component coupled with an associate computer memory component. In particular, the electronic data entry device 100, in this example, has a processor, such as microprocessor unit 102, coupled to a memory unit 104, as part of the computer-implemented system 101, as well as an input module 106, and an optional output module 108 coupled directly or indirectly together through at least one data bus 110. The microprocessor unit 102 executes program instructions, stored in memory unit 104, including instructions relating to the underlying controlling software of the device 100, in response to user input received through the input module 106. Such user input may include, for example, the tapping or actuation of key regions that are of mechanical construction on an electronic keyboard and the tapping or actuation of software configured simulated keys on a touch screen or touch pad as part of input module 106 to access a symbol or function.

The microprocessor unit 102 may process the user input and send the processed results to the output module 108, to present the processed results to the user. The processed results, for example, may be presented to the user in the form of text, graphics, audio, video, or in some other forms of feedback or action, such as the device 100 engaging in communication with another device. Although the input module 106 and the optional output module 108 are shown in the example of FIG. 1 as components included as part of the electronic data entry device 100, they may alternatively be provided as separate entities to the device 100 apart from a single physical unit. It should be observed that the apparatus components described herein have been represented where appropriate by conventional symbols in the drawings, showing only pertinent specific details so as not to obscure the disclosure with details that will be readily apparent to those of ordinary skill in the art having the benefit of the description herein. It is understood that the data entry device may be provided in many different examples such as personal computers, personal digital assistants (PDAs), telephones, wireless telephones, remote controls, electronic musical instruments, control consoles of industrial or medical devices, and the like, or any other device whereby user input is received by the device for processing.

Figure 2:
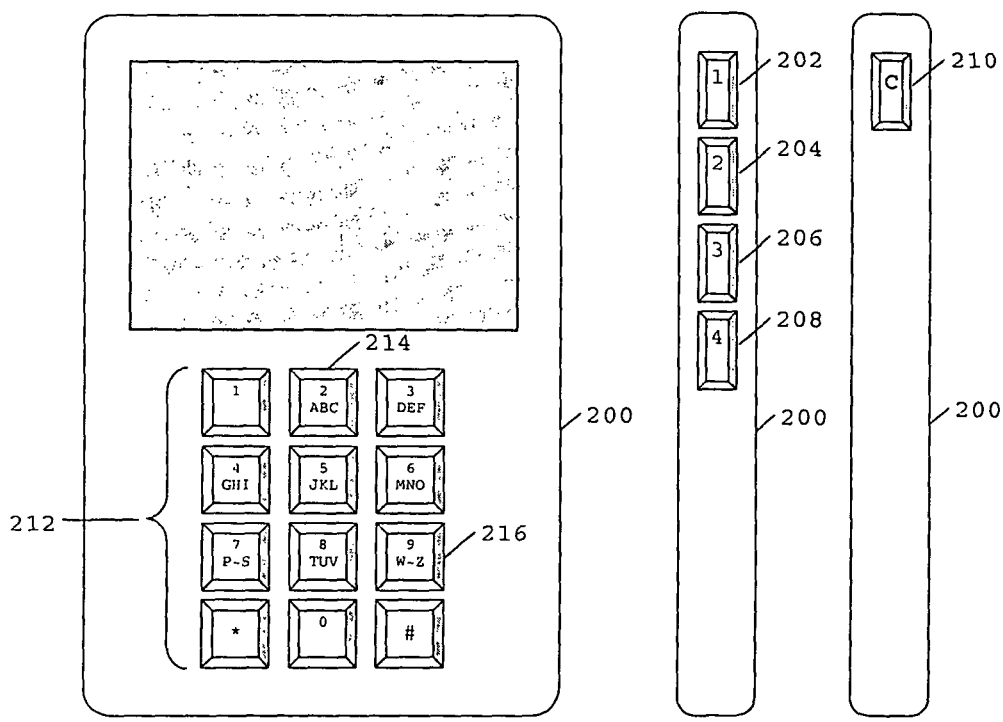
FIG. 2 illustrates an example of a data entry device having a telephone-style layout of main keys in the front and assisting keys on a side of the device.

With reference to FIG. 2, the front and side views of a portable or handheld data entry device 200 having a telephone-style keypad layout is shown. In the example shown in FIG. 2, five assisting keys 202, 204, 206, 208, and 210 are positioned at the sides of the handheld data entry device 200, in which the assisting keys can be readily reached without moving a hand of the user holding the device 200. The multi-symbol main keys 212 are positioned on the front of the device 200 in this example. Each symbol in a multi-symbol main key is represented by a single keystroke or a keystroke combination of a main key and an assisting key. To illustrate, the numbers '0' through '9' can be directly entered by pressing the corresponding main keys 212 in the device 200 depicted in FIG. 2. Letters 'A', 'B', and 'C' are entered, for example, by combining the number '2' main key 214 with assisting keys 202, 204, and 206, respectively. Similarly, the letters 'W', 'X', 'Y', and 'Z' are entered, for instance, by combining the number '9' main key 216 with assisting keys 202, 204, 206, and 208, respectively. The assisting key C 210 functions, in this example, as a 'Shift' key or a 'Caps Lock' key to switch between upper and lower case alphabet entry modes. It is well understood the assignment of the assisting key functions may selectively be changed or modified with corresponding modifications to the data entry device software controlling the assignment of key functions. Such modifications to the data entry device software may, for example, be configured by a user through a user interface. Keyboard arrangements, such as the arrangement illustrated in device 200 of FIG. 2, which utilizes one or more assisting keys to access individual symbols or functions associated with a multi-symbol main key in a telephone-style layout may also be referred to as assisted telephone-style layouts.

In other examples, in which data entry device 200 is provided with dedicated assisting keys (e.g., keys 202-210), a keystroke combination may be represented by actuating a main key followed by an assisting key within a brief pre-selected period of time. In other words, two keys can be actuated in sequence to form a keystroke combination without ambiguity. This provides users with an alternative method for entering keystroke combinations.

For simplicity, only the layout of letters and numbers has been shown in the drawings. Many keystroke combinations or keystrokes may be assigned to correspond to other symbols, such as those often found on conventional keyboards. In practical applications, they can be assigned to other frequently used symbols such as '!', '$', and the like. Various keystroke combinations or keystrokes may also represent certain function keys or control keys such as the 'PgUp' key. For instance, with twelve main keys and five assisting keys, all sixty-nine characters in conventional keyboards can be represented.

For most computer users who are familiar with QWERTY keyboards, data entry device 300, of FIG. 3, can be adapted from conventional QWERTY keyboards and to provide further input efficiency. The device 300 in FIG. 3 is derived by splitting a QWERTY layout, as shown in FIG. 4A, into two halves where the left-hand and right-hand keys meet and folding 400 the right half 402 over and superimposing it onto the left 404 for left-handed users (who use their left hand for typing). Similarly, a right-handed layout (not shown) for the device 300 in FIG. 3 can be derived, as shown in FIG. 4B, by folding 406 the left half 408 of a QWERTY layout over and superimposing it onto the right half 410. Such a layout for right-handed users (who use their right hand for typing) simply have the ordering of the multi-symbol main keys 314 in each row of device 300 reversed. The layouts described herein that are derived via folding a QWERTY layout as illustrated in FIGS. 4A and 4B are also referred to as folded QWERTY layouts. Switching between left-handed and right-handed data entry layouts may be useful to accommodate left-handed or right-handed users. Such a layout switch can be easily achieved using software (or alternatively hardware) controls on an input device that is of the touch screen display type, such as those commonly found on PDAs. Keyboard arrangements, such as the arrangement illustrated in device 300 of FIG. 3, which utilize one or more assisting keys to access individual symbols or functions associated with a multi-symbol main key in a folded QWERTY layout may also be referred to as assisted folded QWERTY layouts.

In addition to the multi-symbol main keys 314, device 300 in FIG. 3 may also include at least two assisting keys on the sides: the number 1 assisting key 302 and the C assisting key 304. The number 1 assisting key 302 may be used to switch to symbols in a different half of the QWERTY layout. For instance, in the left-handed layout shown in FIG. 3, the letter 'Q' may be selected by simply pressing the 'Q/P' main key 306, whereas the letter 'P' may be obtained through a combination of the 'Q/P' main key 306 and the number 1 assisting key 302. The assisting key C 304 can function as a 'Shift' key or a 'Caps Lock' key to switch between upper case and lower case alphabet entry modes. Again, the combination of keystrokes may be obtained by either pressing both keys simultaneously, or by pressing a main key followed by an assisting key within a brief pre-selected period of time.

Additional assisting keys may be used to provide additional keystroke combination modes. For instance, a number 2 assisting key 308, FIG. 3, can be added to provide input for more symbols or additional functions in the device 300 in FIG. 3. With twenty main keys, the full functionality (i.e., sixty-nine characters and eighteen functions) of a conventional computer keyboard can be provided using only four assisting keys 302, 308, 310 and 312, as illustrated in FIG. 3. In FIG. 3, as well as the other drawing figures herein, the keys indicated as having dashed-line boundaries may be considered as optional keys depending on the application or functionality desired. It is well understood the assignment of the assisting key functions may selectively be changed or modified with corresponding modifications to the data entry device software controlling the assignment of key functions. Such modifications to the data entry device software may, for example, be configured by a user through a user interface.

The QWERTY-like data entry device 300 allows users to perform touch typing in a similar manner as done on QWERTY keyboards, except that only one hand is preferably used for typing. This frees the other hand to hold the data entry device and operate assisting keys as needed. To select symbols from the folded half of the QWERTY layout, users can apply the same finger movements on the main keys just as they would with the other hand on a conventional keyboard. For example, in the left-handed folded layout shown in FIG. 3, a left finger (e.g., left little finger) is used to access both the symbols 'Q' and 'P' in the main key 306, where 'P' is the counterpart of 'Q' typically accessed using a corresponding right finger (e.g., right little finger) on conventional QWERTY keyboards.

As previously stated, the figures shown herein illustrate the layout of letters and numbers for simplicity reasons. While many keystroke combinations or keystrokes are not shown as being assigned in the embodiment of FIG. 3, they can be assigned to represent other data information symbols such as '!', '$', and the like in practical applications. Such keystroke combinations or keystrokes may also represent certain function keys such as a 'PgUp' key.

Figure 5:
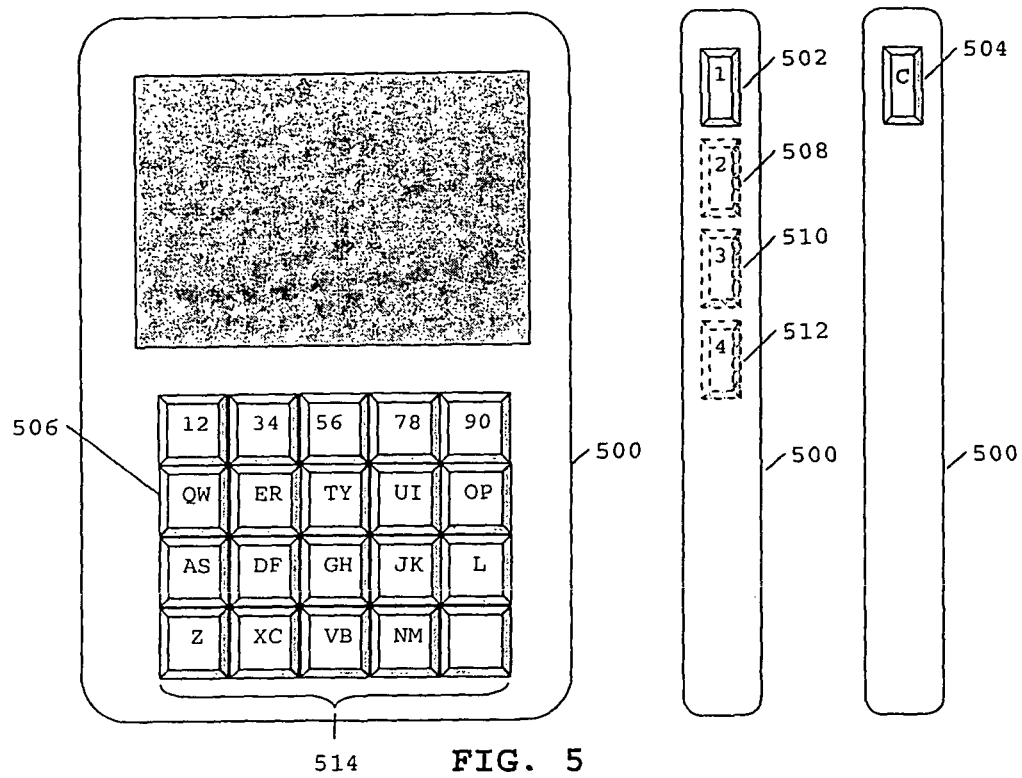
FIG. 5 illustrates an example of a data entry device with a compressed QWERTY layout of main keys in the front and one or more assisting keys on the side.

Another example of a QWERTY-like keypad layout suitable for portable or handheld data entry devices is depicted in FIG. 5. Instead of one symbol per key as on conventional QWERTY keyboards, each main key 514 in device 500 is capable of inputting two or more adjacent symbols, thus reducing the number of keys needed to represent all the symbols on a conventional QWERTY keyboard. Such keypad layouts of main keys 514 may also be referred to as compressed QWERTY layouts. As shown in FIG. 5, two assisting keys 502 and 504 are added to the sides of the handheld data entry device 500, in which the assisting keys can be readily reached without moving a hand of the user holding the device 500. Each symbol in a multi-symbol main key 514 is represented by a single keystroke or a keystroke combination of a main key and an assisting key. To illustrate, the symbol 'Q' can be directly entered by pressing the corresponding main key 506, while the symbol 'W' can be entered, for example, by combining the main key 506 with assisting key 502. As previously stated, the combination of keystrokes may be obtained by either pressing both keys simultaneously, or by pressing a main key followed by an assisting key within a brief pre-selected period of time. The assisting key C 504 functions, in this example, as a 'Shift' key or a 'Caps Lock' key to switch between upper and lower case alphabet entry modes. Keyboard arrangements, such as that illustrated in device 500 of FIG. 5, which utilize one or more assisting keys to access individual symbols or functions associated with a multi-symbol main key in a compressed QWERTY layout may also be referred to as assisted compressed QWERTY layouts.

Additional assisting keys may be used to provide additional keystroke combination modes. For instance, the number 2, number 3, and number 4 assisting keys 508, 510 and 512, respectively, in FIG. 5, can be added to provide input for more symbols or additional functions or controls in the device 500 in FIG. 5. It is well understood the assignment of the assisting key function may selectively be changed or modified with corresponding modifications to the data entry device software controlling the assignment of key functions. Such modifications to the data entry device software may, for example, be configured by a user through a user interface.

As previously stated, the figures shown herein illustrate the layout of letters and numbers for simplicity reasons. While many keystroke combinations or keystrokes are not shown as being assigned in the embodiment of FIG. 5, they can be assigned to represent other data information symbols such as '!', '$', and the like in practical applications. Such keystroke combinations or keystrokes may also represent certain function keys such as a 'PgUp' key.

As shown herein, assisting keys in the data entry devices are used to reduce the number of main keys. The assisting keys are readily located by the user so that they can be comfortably reached with the hand holding the device. Using the data entry device 300 depicted in FIG. 3 as an illustration, the C assisting key 304 may selectively be placed on the side of the device 300 where it can be easily reached by the thumb of the hand holding the device. Similarly, the other assisting key 302, and possibly the assisting keys 308, 310, and 312, if employed, are generally placed on another side of the device 300 where they can be comfortably reached by the other fingers of the hand holding the device 300. With this design, users may actually hold and operate a device using just one hand, where the thumb is used to press both the C assisting key 304 and main keys while the other four fingers are used to operate assisting keys 302, 308, 310, and 312.

Actuating object identification technology is associated with other data entry device embodiments to determine which object, such as a finger from a hand of a user, is used to actuate a key region (e.g., a key), in order to select appropriate user inputted symbols or functions. A key region is a region to which one or more symbols or functions have been assigned such that when a finger or some other object with identifiable feature(s) is detected as actuating or making contact with the region, an assigned symbol or function of the region will be selected as user input in the data entry device. Some examples of key regions include, but are not limited to: discrete mechanical keys, software configured simulated keys on touch screens or touch pads, and virtual key regions comprising some location in two-dimensional or three-dimensional space. It is understood that the surface of an actual discrete key may be considered a key region or a portion thereof.

The application of object or finger identification technology to identify tapping or actuating objects or fingers of a user allows for the determination of input symbols or functions in data entry devices and systems. Such technology used to recognize tapping fingers/objects in a keystroke may be referred to as Tapping Finger Identification (TFI) technology. Identifying a particular tapping object or finger of a user in combination with the determination of an actuated key region (such as a key actuation) can allow for the reduction in the number of keys or key regions needed on a data entry device. In systems implementing actuating object or finger identification technology, symbol selection within a multi-symbol main key or key region is determined by a corresponding actuating object or finger identified in a keystroke. This allows several different key regions such as discrete keys, each capable of inputting one or more symbols or functions, to be merged into one, thus reducing the number of keys needed to provide full keyboard functionality. As the number of keys is reduced, the size of the keys may, for example, be increased, which allows a user to efficiently input data information into a computer-based device or system. This provides a user-friendly, compact data entry device that is suitable for handheld and mobile applications. Furthermore, the number of keystrokes required to enter a symbol or function in the data entry device may also be reduced since the input object (e.g., actuating device or finger), in most cases, directly selects the corresponding symbol or function in a multi-symbol key or key region in a single keystroke.

Techniques used in the identification of actuating fingers generally involve the extraction and matching of various differentiating finger features such as finger skin texture. Since similar techniques can be used, in general, to extract and match differentiating features of non-finger objects, such as object surface texture, the following descriptions herein with references to actuating object identification will focus on tapping fingers, although it is understood that they can be easily extended to non-finger tapping objects.

Figure 6:
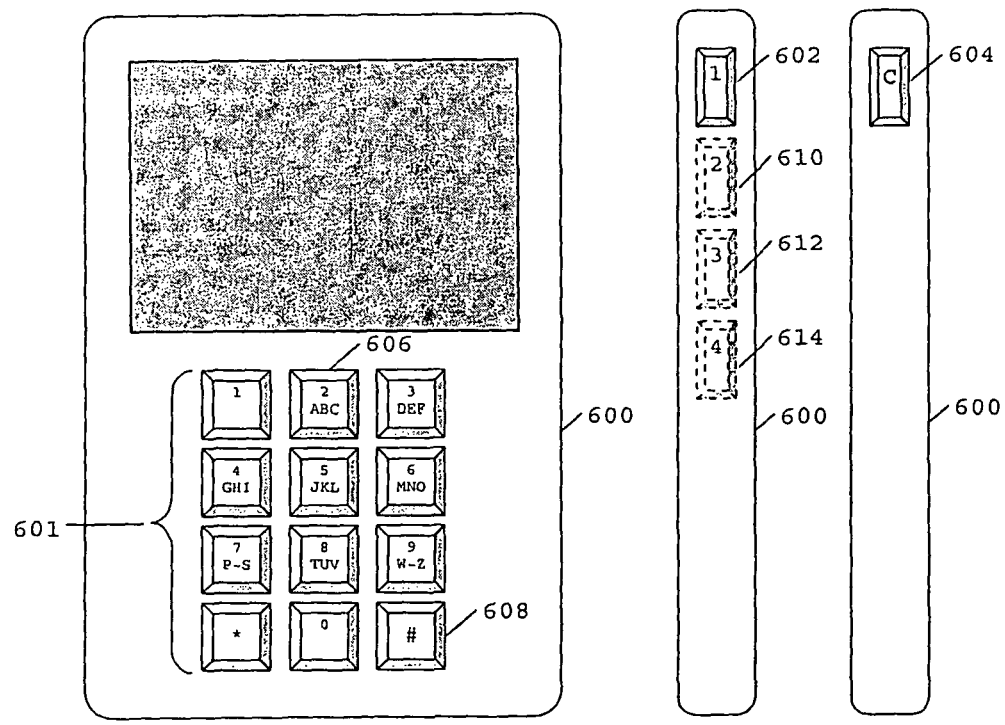
FIG. 6 illustrates an example of a data entry device with a telephone-style layout of main keys in which the device has actuating finger identification capabilities and one or more assisting keys on the side.

Referring to FIG. 6, a telephone-style device 600 with main data entry keys 601 and employing TFI technology is shown. In this embodiment, alphabet symbols may be entered on device 600 with just a single keystroke. As seen in FIG. 6, device 600 has the same main key format as device 200 in FIG. 2, which allows for switching between these two methods by enabling or disabling the finger identification technology via software or hardware controls, and to provide various options to users with different preferences or needs.

The device 600 in FIG. 6 incorporates a telephone-style layout that is operable for both left-handed and right-handed users. Two input modes, numeric mode and alphabet mode, are preferably used in this example. In numeric mode, pressing a main key 601 selects its corresponding number symbol as input in the same manner as on conventional telephone keypads. In alphabet mode, however, the index, middle, and ring fingers of a user are each assigned to a letter on a multi-symbol main key 601. For instance, the symbols 'A', 'B', and 'C' may be obtained by pressing the number '2' main key 606 in FIG. 6 by applying index, middle, and ring fingers of a user, respectively. In this example, all letters except 'S' and 'Z' may be entered by using these three fingers. It is apparent from this example that each alphabet symbol in the telephone-style layout seen in data entry device 600 may be uniquely identified by a combination of the particular tapping finger identified and the multi-symbol main key 601 being actuated. Such a combination of finger and key are hereafter referred to as a 'finger-keystroke combination'.

As previously stated, the figures shown herein illustrate the layout of letters and numbers for simplicity reasons. While many finger-keystroke combinations are not shown as being assigned in the embodiment of FIG. 6, such combinations can be assigned to represent other data information symbols such as '!', '$', and the like in practical applications. They may also represent certain function keys such as a 'PgUp' key. In principle, the thumb and little finger are generally assigned to less frequently used functions or symbols.

There are different ways to provide a quick switch between alphabet input mode and numeric input mode. One such example is to use an assisting key such as side key 602 in FIG. 6. Another way is to assign a finger-keystroke combination such as actuating the '#' key 608 using the thumb of a user. Switching between upper case and lower case alphabet input modes can be achieved via the assisting key C 604, which functions as a 'Shift' key or a 'Caps Lock' key. Also, additional assisting keys 610, 612, and 614, shown in dashes in FIG. 6, may alternatively be used to provide rapid switching of operation modes or access to certain functions or controls. Keyboard arrangements, such as that illustrated in device 600 of FIG. 6, which utilizes TFI technology and optional assisting keys to access individual symbols or functions associated with a multi-symbol main key in a telephone-style layout may also be referred to as TFI telephone-style layouts.

While finger-keystroke combinations have been assigned to different letters, it is understood that changes to the assignment of finger-keystroke combinations are made by implementing appropriate software modifications. For example, instead of using an index finger for the letter 'A', users may selectively assign the ring finger for this letter if desired. In addition, users may also selectively change the assignment of assisting key functions through appropriate modifications to the underlying key function controlling software stored in the microprocessor-based data entry device. Such modifications to the controlling software of a data entry device may, for example, be configured by a user through a user interface.

Figure 7:
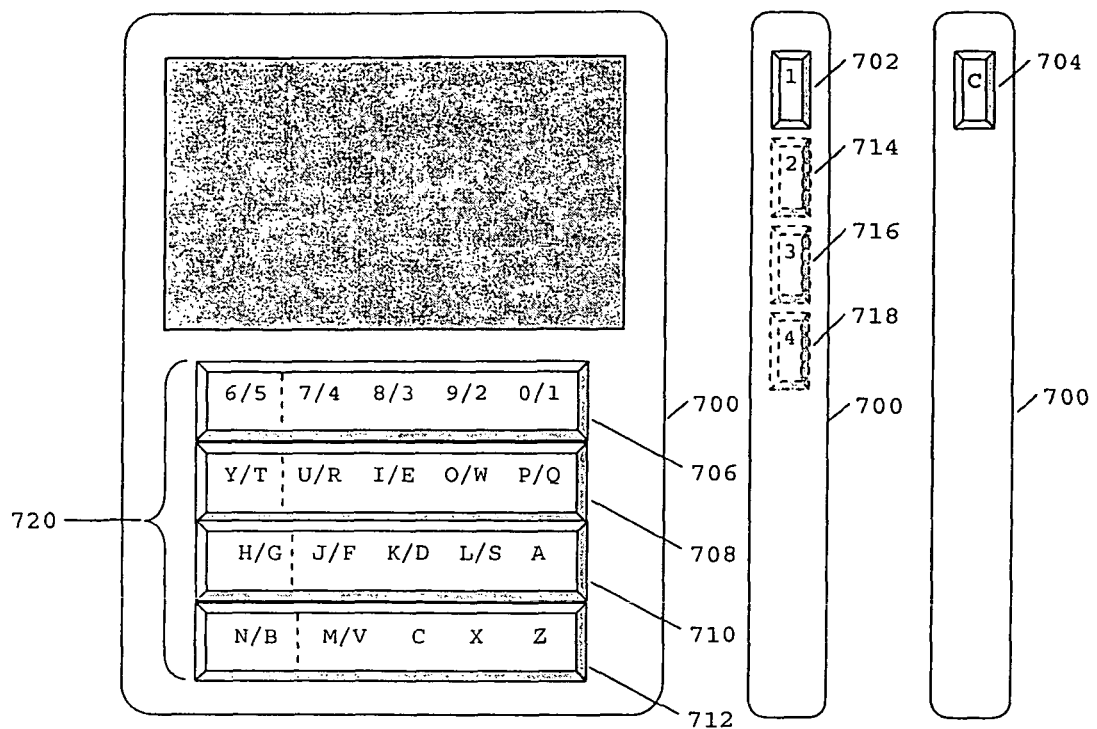
FIG. 7 illustrates another example of a data entry device with actuating finger identification capabilities with the device having a right-handed, folded QWERTY layout of main keys and one or more assisting keys on the side.

Turning to FIG. 7, a data entry device 700 having TFI capabilities is shown, in this example, with a right-handed, folded QWERTY layout of main keys 720. In this embodiment, device 700 utilizes four large main keys 706, 708, 710, and 712 on the main keypad. The technique for one-handed typing in this embodiment uses similar relative finger movements as those used for two-handed typing on a conventional QWERTY keyboard. This is accomplished by assigning a finger or other input object to correspond to a particular symbol or symbol pair on a main key 720. For example, the letter 'A' may be entered by pressing the main key 710 with the right little finger. The precise location where the particular main key is struck is not critical since it is the tapping finger identified that is used in determining a particular symbol on the main key that is actuated.

With continuing reference to the folded QWERTY layout in FIG. 7, an assisting key (side key 702) is employed to switch to symbols in a different half of the QWERTY layout. Other quick switch methods mentioned previously with reference to FIG. 6, such as actuating a main key 720 using one's thumb, may also be used as an option. Similar to device 600 as seen in FIG. 6, additional assisting keys 714, 716, 718 may be added to data entry device 700 on the side as shown in FIG. 7 to provide rapid switching of operation modes or access to certain functions. Furthermore, the assisting key C 704 can function as a 'Shift' key or a 'Caps Lock' key to switch between upper case and lower case alphabet entry modes. It is well understood the assignment of the assisting key functions may selectively be changed or modified with corresponding modifications to the data entry device software controlling the assignment of key functions. Such modifications to the data entry device software may, for example, be configured by a user through a user interface. Keyboard arrangements, such as that illustrated in device 700 of FIG. 7, which utilizes TFI technology and optional assisting keys to access individual symbols or functions associated with a multi-symbol main key in a folded QWERTY layout may also be referred to as TFI folded QWERTY layouts.

Just as an index finger may be assigned to be responsible for two symbols on each row of keys in a conventional QWERTY keyboard while touch typing (e.g., both the letters 'Y' and 'U' are often actuated with the right index finger), the index finger may be designated as being responsible for the two leftmost symbol pairs in each row of main keys 706, 708, 710, 712 in the embodiment shown in FIG. 7. However, an assisting key, side key 714, for instance, may be used to distinguish the shared finger-keystroke combinations. For example, the symbol pair 'U/R' in main key 708 may be obtained without using the assisting key 714, as seen in FIG. 7, while 'Y/T' may be obtained with it. Another option is to use the thumb or a combination of index and middle fingers to actuate the leftmost symbols. Alternatively, each of the leftmost symbol pairs may be assigned to a separate main key, as illustrated in the main keys 804, 806, 808, 810 in device 800 of FIG. 8. Using text prediction and correction techniques well known in the current state of the art to resolve potential ambiguities resulting from the finger-keystroke combination shared by the index finger may also be employed.

Soft boundaries are further selectively provided for determining symbol selection in shared finger-keystroke combinations. Illustrated by dashed lines on the main keys in FIG. 7, adjustable boundary locations are software-defined boundaries (i.e., not physical key boundaries) between two adjacent symbols or symbol pairs that are selectively interpreted only when certain fingers are identified as the actuating finger in a keystroke. The key regions are divided by the adjustable boundary locations defined by user-configurable program instructions stored in the memory 104 associated with the data entry device. Thus, adjustable boundary locations are established by detecting where a key region is struck. Similar adjustable boundary location concepts may be found in existing software-configured simulated keys on touch screens or touch pads commonly employed in PDAs, except that the actuating fingers or objects are not considered in the interpretation of the boundary location or existence. Whenever a key region is actuated, such as on a location of a main key 720, FIG. 7, contact sensors or contactless sensors, to be described subsequently, can be used to detect on which side of the soft boundary the centroid of touch area falls to determine which of two adjacent symbols or symbol pairs was selected as input. For example, the symbol pair 'Y/T' on main key 708 in FIG. 7 may be selected when an index finger of a left hand of a user actuates a region anywhere to the left of the soft boundary on main key 708. Similarly, the symbol pair 'U/R' may be selected when the left index finger actuates a region anywhere to the right of the soft boundary on main key 708. If any of the other fingers were used to actuate main key 708, however, the tapping location on the actuated key region relative to the soft boundary would not matter in the input selection process, since it is only the actuating finger identified that selects a symbol pair for input.

The adjustable soft boundary locations may selectively be turned on or off via software or hardware controls according to user preference or application needs. The front keypad layout in FIG. 7 may be functionally equivalent to the front keypad layout seen in FIG. 8 if soft boundaries for the leftmost symbol pairs are activated. Since the boundary locations are defined by customizable software stored in the data entry device 700, they may be adjusted to suit user preference or applications needs. For instance, the precise locations of the soft boundaries on the main keys 720 shown in FIG. 7 can be set by a user based on the size of the assigned actuating finger.

The adjustable soft boundary locations may also be enabled for all fingers used to actuate main keys 720 on device 700 (i.e., a soft boundary is activated between each adjacent symbol pair on main keys 720), so that device 700 is functionally equivalent to a device in which one main key is provided for each symbol pair. This allows data entry in device 700 to be backwards compatible with methods used in previous embodiments, such as device 300 in FIG. 3, in which assisting keys are used in combination with main keys to select a symbol from each symbol pair. Alternatively, if users hold device 700 with both hands, the use of assisting keys may be reduced since the thumb from each hand can be assigned to correspond to a symbol in each symbol pair. For example, the symbol 'Y' is selected for input if a left thumb is detected as actuating the symbol pair 'Y/T' on main key 708, while 'T' is selected for input if a right thumb is detected as actuating the same pair.

Automatic learning of user behaviors and employing knowledge of such behavior to optimize various settings may further be utilized in various situations. For example, the soft boundaries described with reference to FIG. 7 can be adjusted in terms of locations, shapes, and other configurations by evaluating typographical error patterns of a user. Such knowledge may also be employed to define 'fuzzy' soft boundaries, which are soft boundaries that can automatically adjust their locations, within a pre-determined range, to reduce the potential of a user making typographical errors, for error-prone keys. For example, if the main key 708 in FIG. 7 is configured with a fuzzy soft boundary (illustrated as a dashed line) between the symbol pairs 'Y/T' and 'U/R', the boundary would gradually be shifted to the right by the underlying controlling software if it were detected, such as from learning user input correction behavior (e.g., a symbol input followed by a deletion) or by means of spelling-checking software, that the user made re-occurring errors when entering a symbol from the pair 'Y/T'. This boundary adjustment creates a bigger region for a finger to access the 'Y/T' symbol pair, thereby reducing the rate of error. The adjustment of the fuzzy soft boundary would stop when the boundary reaches a limit of the pre-determined range or when the error rate falls below a pre-selected level. The dynamic adjustment of fuzzy soft boundaries can be based on other forms of user behavior as well, such as the symbol usage frequency of a user and usage of user-specific vocabulary. Application of adjustable soft boundary locations to key regions may result in the size of the regions being proportional to the frequency of input symbol or function usage. Combining the ability to create fuzzy soft boundaries with intelligent spelling correction and prediction technology, available in the current state of the art, that take into consideration the context of the inputted content may further be employed to improve data input efficiency. The boundary locations of the key regions may thus selectively be adjusted based on user behavior, spelling correction determinations or usage frequency of symbols or functions.

As previously stated, the figures shown herein illustrate the layout of letters and numbers for simplicity reasons. While many finger-keystroke combinations are not shown as being assigned in the embodiments of FIGS. 7 and 8, such combinations can be assigned to represent any other data information symbols such as '!', '$', and the like in practical applications. They may also represent certain function keys such as a 'PgUp' key. In principle, the thumb and little finger are generally assigned to less frequently used functions or symbols.

Figure 9:
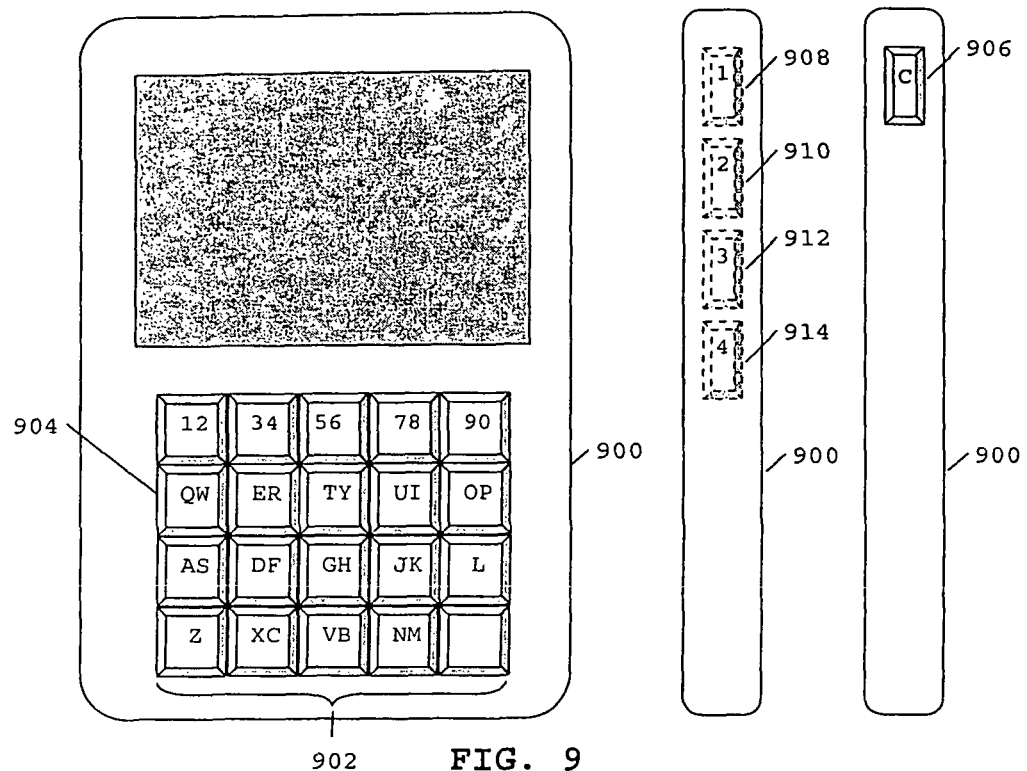
FIG. 9 illustrates an example of a data entry device with a compressed QWERTY layout of main keys in which the device has actuating finger identification capabilities and one or more assisting keys on the side.

With reference to FIG. 9, a data entry device 900 having TFI capabilities is shown, in this example, with a compressed QWERTY layout of main keys 902. In this embodiment, each symbol may be entered on device 900 with just a single keystroke by assigning a finger of the typing hand of the user to correspond to a symbol on a multi-symbol main key 902. For example, the index finger on the right hand of a user may be used to actuate main key 904 in device 900 to input the symbol 'Q', while the middle finger of the same hand may be used to actuate main key 904 to input the symbol 'W'. The precise location where the particular main key is struck is not critical since it is the actuating finger identified that is used in determining a particular symbol on the main key that is actuated. While finger-keystroke combinations have been assigned to different letters and numbers, it is understood that changes to the assignment of finger-keystroke combinations are made by implementing appropriate software modifications. For example, instead of using an index finger for the letter 'Q' and a middle finger for the letter 'W', users may selectively be assigned to the left and right thumb, respectively, for these letters if desired. Such modifications to the data entry device software may, for example, be configured by a user through a user interface.

To improve input accuracy, more than two adjacent symbols may be input by each main key 902 in data entry device 900, FIG. 9, using TFI technology, thereby further reducing the number of main keys needed to input the same number of symbols. A reduction in the number of main keys in turn results in an increase in the size of each key. Correspondingly, additional finger(s) will be assigned to input the additional adjacent symbol(s) on each main key. For example, if the main key 904 in device 900 is now used to input the symbols 'Q', 'W', and 'E', the index finger of the right hand may be used to input the symbol 'Q', the middle finger of the same hand to input 'W', and the ring finger of the same hand to input 'E'. Keyboard arrangements, such as that illustrated in device 900 of FIG. 9, which utilizes TFI technology and optional assisting keys to access individual symbols or functions associated with a multi-symbol main key in a compressed QWERTY layout may also be referred to as TFI compressed QWERTY layouts.

As seen in FIG. 9, data entry device 900 has the same main key format as device 500 in FIG. 5, which allows for switching between these two methods by enabling or disabling the software-based TFI technology stored in the data entry device via software or hardware controls, and to provide various options to users with different preferences or needs. Similar to device 500 as seen in FIG. 5, the assisting key C 906, FIG. 9, may function as a 'Shift' key or a 'Caps Lock' key to switch between upper case and lower case alphabet entry modes. Furthermore, assisting keys 908, 910, 912, 914 may be added to data entry device 900 on the side as shown in FIG. 9 to provide rapid switching of operation modes or access to certain functions or symbols.

As previously stated, the figures shown herein illustrate the layout of letters and numbers for simplicity reasons. While many finger-keystroke combinations are not shown as being assigned in the embodiment of FIG. 9, such combinations can be assigned to represent other data information symbols such as '!', '$', and the like in practical applications. They may also represent certain function keys such as a 'PgUp' key.

It is readily apparent from the above description of the keyboard arrangements with reference to FIGS. 2-9 that various keyboard arrangements incorporating assisting keys, TFI capabilities, or a combination thereof may be generated via a method which includes the following steps: 1) select an existing keyboard arrangement 'X' (e.g., conventional QWERTY, folded QWERTY, alphabetic keyboard, telephone-style, etc); 2) select a number, 'N', indicating the maximum number of assisting keys, differentiable fingers, or some combination thereof to be assigned to individual symbols or functions associated with keys or key regions in a new keyboard arrangement based on X (e.g., N may be no more than 10 for two-hand input, or N may be no more than 5 for one-hand input); 3) generate the new keyboard arrangement, in which each key region is generated by merging no more than N neighboring key regions in the selected keyboard arrangement X; and 4) assign the assisting keys, differentiable fingers, or some combination thereof to input symbols or functions associated with each key region in the new keyboard arrangement. The keyboard arrangement X enabled with assisting keys may be referred to as 'assisted X' Layout. The keyboard arrangement X enabled with TFI and optional assisting keys may be referred to as 'TFI X' layout. Compared with the original keyboard arrangement X, the derived arrangements based on X generated by this method will typically have the appearance of the same symbol or function layout, or, the assignment of actuating fingers to corresponding input symbols or functions remains the same.

Figure 8:
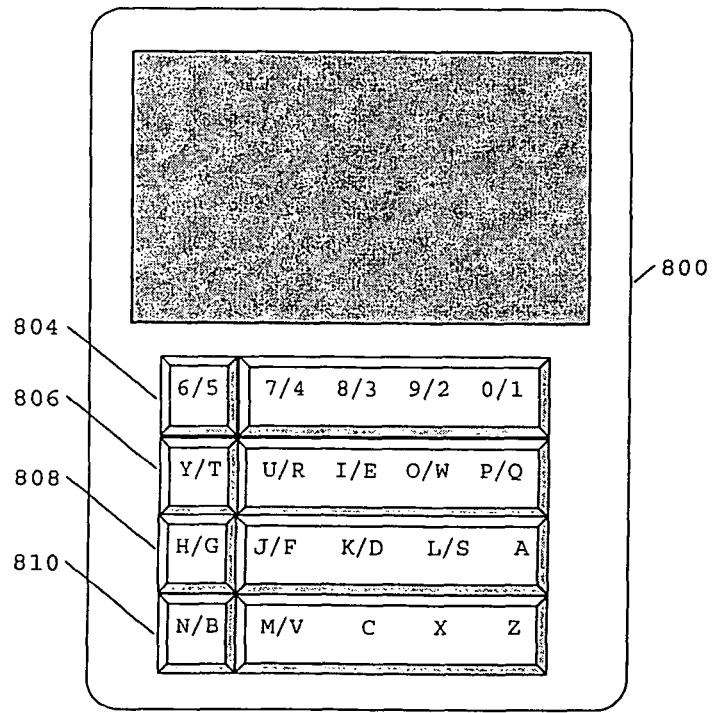
FIG. 8 illustrates an exemplary data entry device with actuating finger identification capabilities with the device having a right-handed, folded QWERTY layout.

For each keyboard arrangement X selected, variations of assisted or TFI keyboard arrangements may exist due to different merging strategies or input symbol or function assignments. For example, the keyboard arrangements shown in FIGS. 3, 7, and 8 are all derived from the folded QWERTY layout. Their usage and symbol layouts are quite similar to one another, except that the ordering of symbols in FIG. 3 is the reverse of FIGS. 7 and 8.

Figure 16:
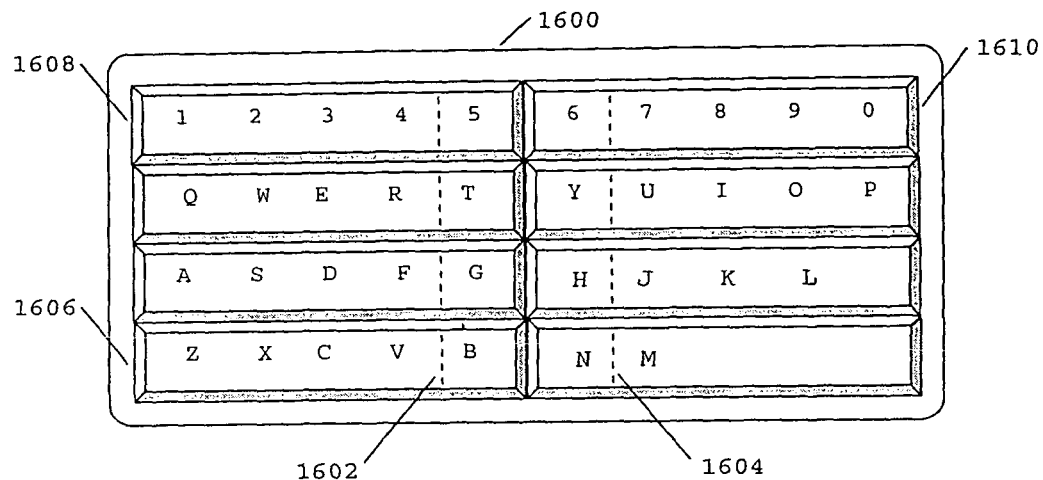
FIG. 16 illustrates an example keyboard of a data entry device having actuating finger identification capabilities.

In a another example, FIG. 16 provides an illustration of one TFI full QWERTY layout incorporating soft boundary locations 1602 and 1604 derived from conventional QWERTY keyboards. For simplicity reasons, only letter and number symbols are shown. The use of soft boundary locations in the TFI layout of FIG. 16 to resolve shared finger-keystroke combinations of the two index fingers used in touch typing (e.g., the left index finger is used to access both '4' and '5', and the right index finger is used to access both '6' and '7') may be eliminated by further applying the method for generating TFI keyboard arrangements detailed above. The location of the symbols '5', 'T', 'G', 'B', and '6', 'Y', 'H', 'N' in the middle two columns of the keyboard each bounded by soft boundary locations 1602, 1604 on one side may be swapped, leaving a total of still eight keys without soft boundary locations. However, the assignment of the symbols to the actuating fingers remains the same. To illustrate, the derived layout would have the symbols '1', '2', '3', '4', and '6' in left-to-right order on the upper left-hand key 1608, and the symbols '5', '7', '8', '9', and '0' in left-to-right order on the upper right-hand key 1610. Actuating the upper left-hand key 1608 with the little, ring, middle, and index fingers of the left hand inputs the corresponding symbols '1', '2', '3', and '4', respectively, while the upper right hand key 1610 actuated with the left index finger selects the symbol '5' for input. Similarly, actuating the upper right-hand key 1610 with the index, middle, ring, and little fingers of the right hand inputs the corresponding symbols '7', '8', '9', and '0', respectively, while the upper left hand key 1608 actuated with the right index finger selects the symbol '6' for input. The precise location where a particular key is struck is not critical since the identification of the tapping finger here alone can determine which particular symbol on the key is being input.

In a further example, the aforementioned method may be applied to alphabetic layouts such as those found in many PDAs and electronic dictionaries, in which the symbols or functions are arranged in alphabetical order from left to right within each row of keys and also from top to bottom between the rows of keys, to generate keyboards with fewer number of key regions that are better suited for portable devices.

Several techniques can be used to identify tapping fingers or objects performing actuation on a key region of a data entry device, such as those shown in FIGS. 6-9. These technologies employ contact sensors, contactless sensors, or some combination thereof to identify a tapping or actuating finger in a keystroke. During the input processing at the data entry device, an actuating finger must make physical contact with a contact sensor in order for the sensor to detect relevant features(s) associated with the finger. A contactless sensor, however, is capable of detecting relevant finger feature(s) from a remote location. Cameras and fingerprint sensors are two examples of sensors commonly used in finger or object identification. Fingerprint sensors are sensors capable of capturing biometric fingerprint features. Many types of fingerprint sensors, for example, are contact sensors. Cameras are optical sensors that capture still or motion pictures using visible or infrared light. Optical sensors generally operate as contactless sensors.

Some examples of finger-related features detected by sensors include, but are not limited to: finger size, finger shape or geometry, hand shape or geometry, finger nail size, finger nail shape, finger nail color, finger nail edge, finger nail texture, finger impedance, finger conductance, finger capacitance, finger inductance, tapping area, tapping pressure, touch area and finger size ratio, fingerprint, finger skin texture, finger skin tone, and finger thermal and ultrasound properties. Sensors used to identify the actuating fingers based on such features include, but are not limited to, sensors capable of measuring: impedance, conductance, capacitance, inductance, pressure, contact area, temperature, and electromagnetic wave or ultrasound reflection properties. Such sensors may be selectively placed in various positions, such as in front of, behind, or underneath the key regions (such as underneath the keys), to capture features at desired directions or orientations. Two or more distinguishing features, such as finger shape and finger size, may be combined to improve performance and reliability. Thus, multiple sensors of different types may selectively be placed at different locations as a further approach to identify fingers used in actuating key regions.

Identification of actuating fingers using some of the differentiating features, such as finger size, fingerprint, and skin texture, in some examples, have a brief enrollment session before a user begins the input operation. The enrollment session, for example, has the user momentarily placing each of his fingers on a sensor to enable the device to register and, thus, later differentiate and identify the different fingers used to represent the different symbols or functions associated with the key regions (such as main keys). This method of enrollment and may be used to provide additional security functionality in many applications as well, since only enrolled users may be granted access to their devices.

A straightforward way of identifying tapping fingers is via identification of biometric features such as fingerprint, skin vein patterns, and some skin texture features including the so-called local skin patterns. For example, fingerprints may be detected by contact sensors as a feature in the identification of actuating fingers. By placing one or more contact sensors under the main keys, for example, fingerprint recognition technology can be applied to identify an actuating finger from other fingers of a hand, using established techniques. Thus, the corresponding symbol or function assigned to a finger at a particular key region may be entered according to a finger-keystroke combination.

The identification of actuating fingers or objects to determine user input differs from conventional user identification operations utilizing biometric solutions. This is due to the one or more of the following factors. (1) Instead of differentiating one sample from many other samples potentially from a great number of individuals, the identification of actuating fingers or objects generally, only needs to differentiate one from a number of others (such as ten others) from the same individual. Finger size, for example, can be used to efficiently and economically differentiate the middle finger from the little finger of a person's hands; (2) Biometric approaches are not utilized for input with non-finger actuating objects such as a stylus or a glove. Also, (3) Conventional biometric sensors are generally not well suited for many data entry applications. Users may not carefully place their fingers on the sensors during tapping to allow capture of high-quality feature samples, while at the same time, tapping may offer features that can not be differentiated using biometric sensors. In consideration of the above factors, the scope of sensors and features used in identifying actuating fingers and objects may be expanded to include non-biometric sensors in order to improve performance or lower cost. The description of example embodiments incorporating finger or object identification technologies is focused primarily on the use of non-biometric sensors, such as optical sensors. Furthermore, through the use of fusion techniques, biometric sensors may be selectively used in conjunction with other sensors to further improve the performance and reliability of a data entry device.

Figures 10A, 10B:
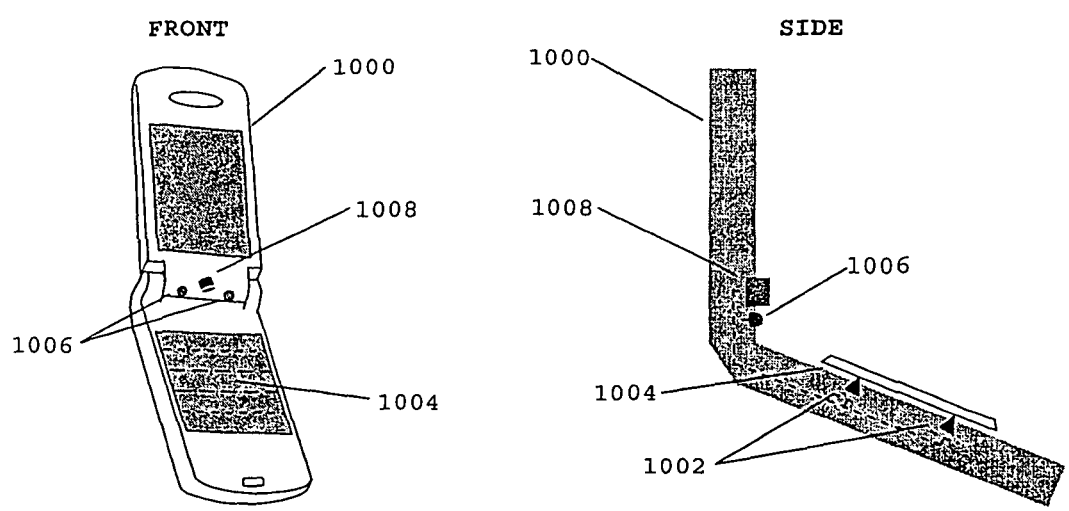
FIG. 10A shows a front perspective view of one embodiment of an example data entry device with actuating finger identification capabilities and soft boundary capabilities.
FIG. 10B shows a side view of the embodiment of the data entry device example of FIG. 10A.

Referring to FIGS. 10A and 10B, one example embodiment of a data entry device 1000 is shown, in which keystrokes are used to trigger sensors associated with the input module of the device 1000 for the identification of tapping or actuating fingers of a user. FIG. 10A provides a front perspective view and FIG. 10B provides a side view of device 1000, the input module of which is configured with contactless sensor 1008, light emitting diodes (LEDs) 1006, main keypad 1004, and multiple triggers 1002 positioned under the main keypad 1004. With soft boundaries configured horizontally to define five rows of keys as illustrated by hashed lines in FIG. 10A, a single large main keypad 1004 employing contact sensors is used to provide main key functions, with the layout of main keys on the keypad 1004 being programmable. Soft boundaries may be set at different locations, which may include vertical boundaries in addition to horizontal ones, providing for different key region layouts. The main keypad 1004 is used, in this example, to detect finger tapping locations, thereby determining which of the five main keys was struck in a keystroke based on where the centroid of touch area is detected relative to the soft boundaries. Although the keypad 1004 depicted in the example embodiment of FIGS. 10A and 10B is one of the touch sensor type, it is understood that the keypad 1004 may, instead, comprise of discrete mechanical keys.

To determine which of the symbols on a main key is selected, sensor 1008 is used to identify the tapping finger used in the keystroke. The contactless sensor 1008 in this example may be an optical sensor (e.g. a camera) which may be of various types. An infrared or near-infrared camera may be used in this example embodiment due to its effectiveness under various background conditions. LEDs 1006 may be employed to provide extra lighting in dark environments. To save energy, the optical sensor 1008, as well as LEDs 1006, may be triggered by keystrokes. An additional light sensor (not shown) may be used to automatically disable the LEDs 1006 in environments with sufficient lighting.

Figure 11:
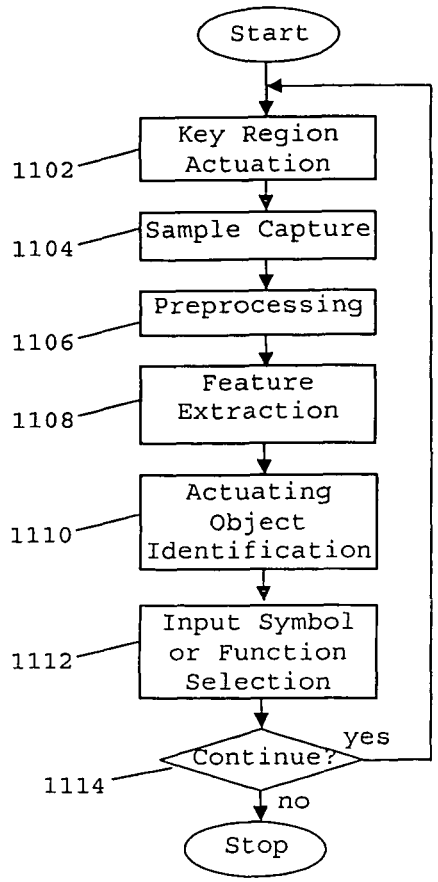
FIG. 11 is a flowchart illustrating processes for actuating finger or object identification.

FIG. 11 is a flowchart illustrating the process utilized by a data entry device (such as device 1000, FIGS. 10A and 10B) to determine which symbol or function on a multi-symbol main key or key region is being input in response to user actuation of the device. This process includes the following steps: 1) key region actuation 1102, 2) sample capture 1104, 3) preprocessing 1106, 4) feature extraction 1108, 5) actuating object identification 1110, and 6) input symbol or function selection 1112. As will be understood by skilled artisans the receipt and processing of such information is preferably performed by the microprocessor 102 operating in conjunction with an associated memory 104 of the computer-software based data entry device 100, FIG. 1. For example, during operation of the data entry device 1000, FIG. 10, the detection of keystrokes on the main keypad 1004 as determined by the triggers 1002 positioned under the main keypad 1004 is performed in step 1102. The detection of a keystroke will trigger a sample capture performed by sensor 1008 in step 1104. The sample captured, in this example, is a still image containing details pertaining to the actuating object, such as a tapping finger of a user. Besides still images, the sample captured in other instances may comprise of audible signals such as the sounds of impact generated by actuating objects when they make contact with a key region, motion videos, three-dimensional ultrasound maps, and the like. The captured image, in this case, undergoes one or more preprocessing operations in step 1106, such as color balance, brightness adjustment, sharpening enhancement, and the like. In step 1108, key features on the actuating object are extracted. The order of steps 1106 and 1108 may selectively be altered. For instance, step 1108 may be carried out prior to step 1106, since the amount of data to be operated upon during the preprocessing in step 1106 is significantly less when it is performed only on the extracted features. An identification of the actuating object is made in step 1110 based on the features extracted in step 1108. In step 1112, one of the multiple symbols or functions associated with the actuated key region corresponding to the actuating object identified is selected for input. In step 1114, the processing determines if additional symbol inputs or function are needed to be identified. Steps 1102-1112 are then repeated to determine additional symbol inputs or functions if the finger identification processing continues in step 1114. Otherwise, the operation may be terminated.

In one embodiment utilizing optical sensors, the different tapping fingers are identified by assigning various colors to the corresponding fingers on one or more typing hands of a user. For example, different color tapes may be affixed to the finger nails of a typing hand, or a glove having different colored finger tips (e.g. proximate to the finger nails of a user) may be worn by the user, with a different color assigned to each typing finger of the user. Alternatively, nail polish of various colors can be applied to different fingers in order for the optical sensors and associated software-based components of the data entry device to distinguish one finger from another.

Figure 12A:
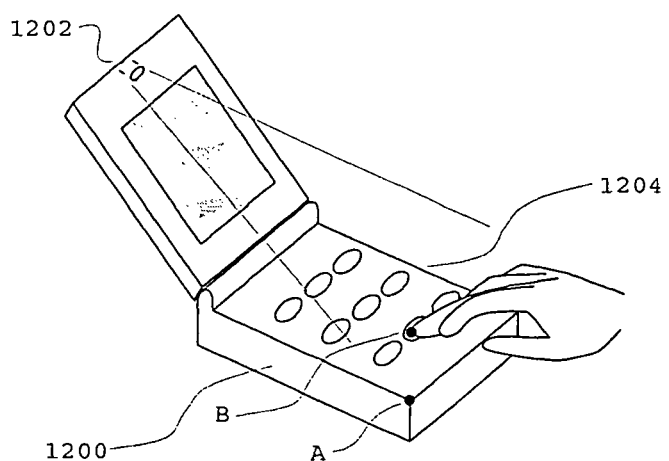
FIGS. 12A and 12B illustrate exemplary data entry devices having optical sensors used in determining actuating fingers of a user.
Figure 12B:
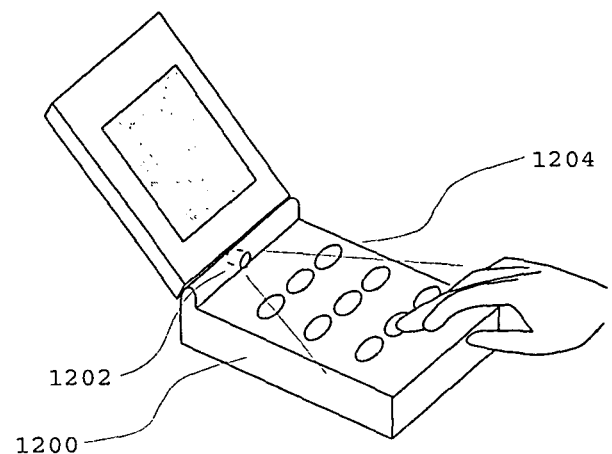

As a specific implementation of the example embodiment depicted in FIGS. 10A and 10B, FIGS. 12A and 12B illustrate a data entry device 1200 incorporating an optical sensor 1202 that identifies actuating or tapping fingers based on various different artificial colors assigned to the corresponding typing fingers. The sensor 1202 can be mounted in different positions as shown in FIGS. 12A and 12B. Still other positions, such as directly on the keypad 1204, may be possible. In the examples shown in FIGS. 12A and 12B, keypad 1204 is shown having discrete mechanical keys. As mentioned previously with respect to the keypad 1004 depicted in FIGS. 10A and 10B, instead of having discrete mechanical keys, the keypad 1204 in device 1200 may alternatively comprise a touch screen on which keys are simulated in software. A finger making contact with a key on the touch screen is processed in a similar manner to the actuation of the corresponding discrete mechanical key.

Figure 13:
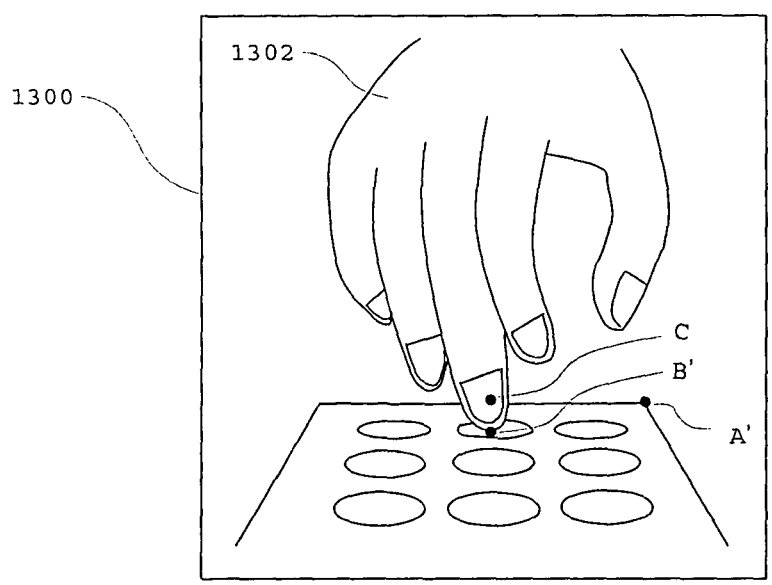
FIG. 13 illustrates an example image captured by the optical sensor of the device in the embodiment of FIG. 12A.

Prior to first-time input operation, data entry device 1200, FIGS. 12A and 12B, undergoes an initial calibration procedure, in which the key regions on the keypad 1204 are mapped onto regions in the image captured in step 1104, FIG. 11. A sample image 1300, as seen in FIG. 13, is captured by the optical sensor 1202 of device 1200, FIG. 12A. For illustration, it can be seen in FIG. 12A that the point A, with planar coordinates (x, y), on the keypad 1204 is mapped to point A', with coordinates (x', y'), in the two-dimensional image capture 1300 seen in the example shown in FIG. 13. Similar points on the keypad 1204 whose mapping on the captured image 1300 can be readily identified may be selected as reference points used to derive a transformation function that computes mapping transformations of arbitrary points on the keypad 1204 to corresponding locations on the captured image 1300. Such mapping transformations, for example, may be carried out using matrix equations that map one Euclidean space to another, which is well known in image calibration techniques. Four reference points with known coordinates on the keypad and in the captured image 1300 may be manually selected for the calculation of the parameters in the transformation matrix. These parameters are fixed after this calibration process as long as the relative position between the optical sensor and keypad is not changed.

Returning to FIG. 11, in step 1102, the actuation of a key region on the keypad 1204 by a finger triggers an image capture by the optical sensor 1202 that is performed in step 1104. The image 1300 depicted in FIG. 13 illustrates one example of a captured image. Preprocessing operations are then performed on the image 1300 in step 1106 to account for variations in the lighting conditions in the environment where the image is captured. Examples of such operations include, but are not limited to, color balance and brightness adjustments. To assist with these operations, predetermined locations on the device portion of the captured image 1300, such as at the point A' in FIG. 13, can serve as references. Artificial objects with preset colors may be included in these locations to provide further references to reflect background lighting conditions.

Next, in step 1108, FIG. 11, a color sample of the tapping finger tip is taken, since the various artificial colors assigned to the corresponding tapping fingers serve as differentiating features in identifying the tapping fingers. This is done by first determining the mapped location, labeled B' in the image 1300 of FIG. 13, of the point of finger contact, labeled B in FIG. 12A, with the actuated key region on the keypad 1204. The location at which the sample is collected, labeled C (e.g. proximate the finger nail region) in the captured image 1300, as seen in FIG. 13, is vertically offset from B' since the finger nail area is slightly above the point of finger contact with keypad 1204. For increased robustness, multiple color samples can be taken from the vicinity of location C. As mentioned previously, steps 1106 and 1108 may be carried out in any order.

Once the preprocessing on the collected color sample has been done, the tapping finger is identified in step 1110 through an analysis and classification of the color sample as a different color is assigned to each typing finger of the user. The analysis of the color sample may selectively be carried out in any one of the many well known color spaces, such as RGB and YIQ. In one example, normalized RGB space is utilized. In the RGB space, the collected color sample is a point in a three-dimensional vector space. Each point in the space is defined by an ordered triple (r, g, b) of the primary component colors red (R), green (G), and blue (B), respectively. Normalizing its RGB components by the following equations, the sample is mapped to a point in the normalized RGB space with the ordered triple ($\bar{r}, \bar{g}, \bar{b}$):

$$\bar{r} = \frac{r}{r+g+b}; \bar{g} = \frac{g}{r+g+b}; \bar{b} = \frac{b}{r+g+b}.$$

Since the three components of a color sample in the normalized RGB space sum to one, a color sample may be classified using only two of the three components, such as R and G. An example of a collected color sample 1400 with components ($\bar{r}, \bar{g}$) mapped to the two-dimensional reduced RGB space is illustrated in FIG. 14. Also shown in FIG. 14 is the mapping of actual artificial colors red 1402, green 1404, and blue 1406 applied to the typing fingers of the user. This mapping may be obtained from a registration process that is performed before the first input operation, or once before every input operation.

In order to classify the collected color sample 1400, FIG. 14, as one of the artificial colors used for identifying the actuating finger, the Euclidean distances $d_r$, $d_g$, and $d_b$ between the sample 1400 and the artificial nail colors 1402, 1404, and 1406 may be calculated. The artificial color that is the shortest distance away from the collected color sample 1400 is taken as the color of the actuating finger. Alternative approaches, such as the Mahalanobis distance, that utilize statistical measurements may also be used to identify collected color samples. Although the colors red, green, and blue are selected here as artificial colors to identify typing fingers of a user, other colors, such as purple, yellow, magenta, etc., may also be used and it is desirable that their mappings in the chosen color space are spread far apart. Additional colors, of course, may be employed to identify additional fingers.

In step 1112 of FIG. 11, one of the multiple symbols or functions on the actuated key region is selected for input based on the typing finger identified in step 1110. For example, if the alphabet symbols 'T', 'U', and 'V' input by the number '8' key on a conventional telephone keypad are assigned, respectively, to the index, middle, and ring fingers of the right hand of a user, then an identification of the actuating finger on the number '8' key as the index finger selects the letter 'T' for input. Additionally, actuating the number 8 key with the middle finger would cause the letter 'U' to be entered, and the letter 'V' would be entered if the ring finger were used.

In another specific implementation of the example embodiment illustrated in FIGS. 10A and 10B that utilizes optical sensors, rather than using a color assignment and detection approach to recognize tapping fingers, visual features are able to be extracted from bare fingers such as edge points reflecting salient features on tapping fingers. These visual features are used to identify the actuating or tapping fingers. The process for determining the input symbol with this approach are similar to those described with reference to FIGS. 11-14, except that, instead of colors, the edges of the fingers actuating key regions are extracted in step 1108 of FIG. 11, and then used in the identification of the actuating finger in step 1110. If desired, this specific implementation of detecting fingers by their edges, described herein, may provide for additional approaches such as for generating an outline of a typing hand and identifying a tapping finger by counting the detected fingers from left-to-right order or vice versa.

Again, returning to FIG. 11, an image capture is performed in step 1104 by the optical sensor 1202, FIG. 12A, after it has been triggered by the actuation of a key region on the keypad 1204 by a finger in step 1102. The image 1300 depicted in FIG. 13 illustrates one example of a captured image. In step 1106, FIG. 11, preprocessing operations such as color balance and brightness adjustment are performed on the image 1300 captured in step 1104, to account for variations in the lighting conditions in the environment where the image is captured. Background subtraction or skin-tone area extraction techniques may also be used during the preprocessing in step 1106 prior to step 1108 to separate finger features from keypad background.

In step 1108, edge points of the typing hand may be extracted from the image 1300 by using various edge detection techniques. The Canny edge detection algorithm, for example, may be employed in this embodiment. Registration of each tapping finger of the user with the data entry device is performed in this embodiment. The registration may selectively be performed either just once before the very first input operation, or, once before every input operation. The registration process may be performed by simply actuating a particular set of key regions using certain fingers in a particular order. Registration may also be performed by pressing a set of pre-assigned key regions with a set of pre-assigned fingers all at once. The finger features extracted during registration are then stored in memory as templates for matching later in the identification of tapping fingers in step 1110 during normal input operations. For robust performance during the matching operations, enrollment of multiple templates for each finger may be employed.

In step 1110, FIG. 11, a matching of the stored templates against the features extracted from tapping or actuating fingers in step 1108 is performed. Edge maps derived from tapping or actuating fingers in step 1108 are matched against every template obtained from registration. Edge-matching techniques such as hierarchical Chamfer matching, Hausdorff-based distance, and the like provide matching distance measurements between the captured samples and the templates. The finger whose template has the shortest matching distance from the features extracted from the captured sample is selected as the tapping finger. Detection of finger orientation and scaling relative to the tapping distance from the optical sensor may selectively be used before the matching to expedite the processing. In step 1112, the resultant finger identification in combination with the actuating key region determines the input symbol or function selection.

In addition or as an alternative to finger nail colors and finger edges, other finger features may be detected by contactless sensors and used for identification. These include, but are not limited to, finger size, finger shape, finger skin texture, finger skin tone, finger vein pattern, and finger thermal and ultrasound properties. Such sensors may be selectively placed in various positions, such as above, in front of, or behind the key regions (such as the physical keys), to capture features at desired directions or orientations. Measurements of various finger features or other attributes derived from those features are also employed in the areas of computer vision and biometrics. Two or more distinguishing features, such as finger skin texture and finger skin tone, may be combined for further performance and reliability. Thus, multiple contactless sensors of different types may selectively be placed at different locations as a further approach to identify fingers used in actuating key regions.

For features describing certain distribution patterns such as finger vein pattern, fingerprint, finger skin texture, etc., texture matching techniques similar to the one used for finger edge matching described previously may be directly applied. Matching methods based on salient points has also been widely used to match vein patterns and fingerprints. Skin texture features correspond to unique skin patterns excluding fingerprint and salient edges on the skin surface. Matching of such features reflecting local skin pattern have been employed in biometric recognition and may selectively be used to differentiate different fingers.

For features describing certain numeric attributes such as finger size, color, etc., the method described previously for color matching may be applied. When the feature dimension grows big, it is also preferable to use principle component analysis (PCA), linear discriminate analysis (LDA), or other dimensionality reduction techniques before comparing captured samples with enrolled templates. Such methods have been widely used to recognize various objects and may be employed to recognize fingers.

While described separately herein, various approaches to finger identification utilizing different types of sensors can be combined to provide further reliability and adaptability. For example, a finger identification approach utilizing contactless sensors, such as optical sensors, may be used in conjunction with one that utilizes contact sensors, such as fingerprint sensors, in a data entry device. Fusion of results from independent matching modules based on different features can be achieved by first calculating a weighted sum from the distance values generated by each module. The finger whose template has the smallest weighted sum is selected as the tapping finger. The pre-defined weights used in the sums may be determined empirically or through training using Bayesian belief networks. The accuracy of the identification after performing fusion should be no worse than the best achievable using the individual modules.

Although the sensors described thus far are passive, active sensors which emit reference signals and then measure the feedback provided by those signals may also be employed. For instance, by projecting a series of illuminated horizontal rays onto the typing fingers, either from in front of or behind the fingers, the complexity of the operations in tracking or detecting fingers may be reduced since the sensor simply processes the feedback from the reference signals. Active sensors may also aid in eliminating background noise or providing extract features that are not available from passive sensors. For instance, active signals such as sound or patterned lights are normally needed to obtain acoustic reflection features or three-dimensional contour features from a finger surface.

FIG. 15A illustrates an example device 1500 configured with an active sensor 1502 projecting two illuminated horizontal rays 1504 and 1508 as reference signals onto the typing fingers of the hand 1526 of a user. With this configuration, the active sensor 1502 detects the tapping finger by identifying the finger on which traces of both reference signals 1504 and 1508 are present, since that is the finger that has been extended to actuate a key region. The finger identified in this example, as shown in FIG. 15A, is the middle finger. Alternatively, the active sensor 1502 can detect a tapping finger by identifying non-tapping ones on which traces of the reference signal are absent.

An active sensor need not be a single physical unit. The active sensor may include multiple components, one or more of which may be responsible for the projection of reference signals while one or more may be responsible for the detection of feedback from reference signals. As illustrated in FIG. 15A, a component 1510 may serve as a detection portion of an active sensor used to detect or measure the feedback from the reference signals generated by the projection component 1502 of the same sensor.

FIG. 15B illustrates a second example device 1512 configured with active sensor 1516 projecting two horizontal rays 1518 and 1522 serving as reference signals from behind the typing fingers of the hand 1524 of a user. Similar to device 1500, FIG. 15A, a detection component 1514, FIG. 15B, may be employed if the component 1516 of the active sensor is responsible only for the projection of reference signals. Multiple active sensors or sensor components may also selectively be employed in a single system in further identifying actuating or tapping fingers. In device 1512, FIG. 15B, for example, an additional active sensor (not shown) may be added to project a reference signal onto the bottom of the palm of the hand of a user in order to provide for detection of a finger tapping position relative to the palm.

Many alternative forms of optical reference signals may be employed. For example, a grid of horizontal and vertical rays may be utilized in some system configurations. Such a form of reference signal could be used to establish a three-dimensional image of the actuating hand of a user to better enable an input device to identify the tapping finger. For instance, the formation of a three-dimensional image can provide three-dimensional features to assist in the identification of the actuating finger and improve segmentation, which is a process that separates the actuating finger from the non-actuation ones. Three-dimensional images can also be generated by infrared or laser radar. Furthermore, reference signals need not be optical in nature. It will be appreciated that other types of reference signals may be used to assist in the identification of tapping fingers by revealing, for example, the ultrasound reflection properties of the fingers.

The methods described herein may also be applied to traditional two-hand input applications by identifying fingers of both hands. In such cases, switching between different halves of a QWERTY layout during typing is not needed. As seen in the embodiment of FIG. 16, each half of keypad 1600 has four main keys and typing is performed in the same manner as on a traditional QWERTY keyboard. The dashed lines 1602 and 1604 in FIG. 16 indicate soft boundary locations for the symbols in the two center columns. For example, the letter 'V' may be entered by pressing main key 1606 with the index finger of a left hand of a user anywhere to the left of the soft boundary 1602. The precise location where the main key 1606 is struck is not critical since it is the actuating finger identified that selects a particular symbol on the main for input. To select the symbol 'B' for input, however, the left index finger must actuate main key 1606 anywhere to the right of the soft boundary 1602, since soft boundary is in effect for that symbol assigned to the left index finger.

Figure 17:
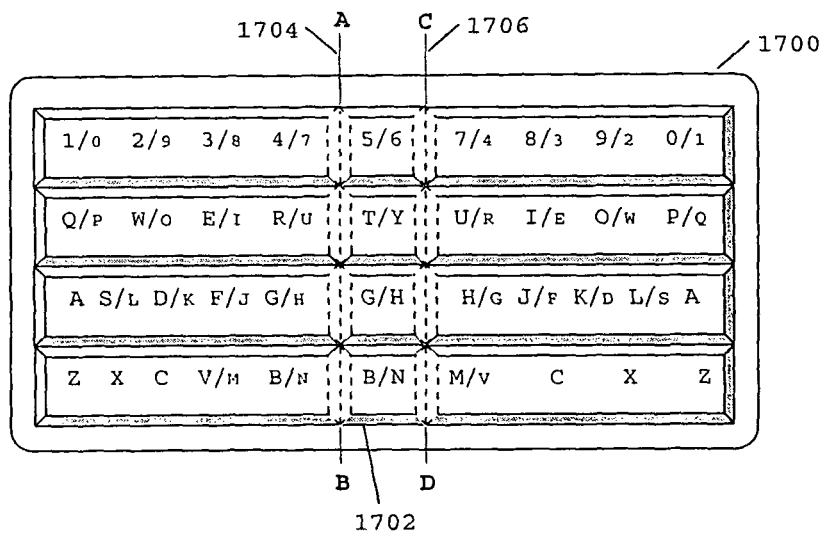
FIG. 17 illustrates an example of a foldable keyboard for a data entry device having actuating finger identification capabilities.

In a handheld device where the keypad portion can be physically unfolded into a traditional QWERTY keyboard, switching between one-handed and two-handed operation modes is achieved using software or hardware controls to enable or disable the folding portion of the keypad. For example, the hinge section of the folded portion of the keyboard may be configured with a-hardware switch such that the switch automatically enables that portion of the keyboard when it is unfolded. In these devices, finger identification methods described herein may be used to further reduce the number of keys needed, thereby allowing each key on a compact keypad to be larger and, thus, symbol input to be more efficient. This can be accomplished, for example, by merging the two center columns of symbols depicted with dashed borders 1602, 1604 on one side to indicate soft boundaries, as seen in FIG. 16, into a single column 1702 of symbol pairs illustrated in the keypad 1700 as seen in FIG. 17. The resultant merged symbol column 1702 is functionally equivalent to the leftmost column of symbol pairs illustrated in device 800, FIG. 8. The lines A-B 1704 and C-D 1706 in FIG. 17 indicate axes on which the keypad may be physically folded to enable users to switch over to typing on a right-handed and left-handed folded QWERTY layout, respectively. In the center column 1702 of symbol pairs, the symbol from the desired half of the keyboard 1700 is selected using the index finger of the hand responsible for inputting symbols in that half of the keyboard. Except for the keys in the center column 1702, the other keys in this example have symbol pairs each with a large and a small label. The large symbol labels on these keys, FIG. 17, represent the corresponding input symbol when the keypad 1700 is operated in both two-handed mode and one-handed mode, while the small labels represent the corresponding input symbol on the other (i.e., folded) half of the keypad when the console is operated in one-handed mode.

As previously stated, the figures shown herein illustrate the layout of letters and numbers for simplicity reasons. While many finger-keystroke combinations are not shown as being assigned in the embodiments of FIGS. 16 and 17, such combinations can be assigned to represent other data information symbols such as '!', '$', and the like in practical applications. They may also represent certain function keys such as a 'PgUp' key. It is understood that changes to the assignment of finger-keystroke combinations are made by implementing appropriate modifications to the underlying controlling software. For example, instead of using an index finger for the letter 'V', users may selectively assign the middle finger for this letter if desired.

In addition to identifying tapping or actuating fingers as input objects, other different tapping input objects can also be differentiated using the methods applied for identifying particular fingers. Finger-keystroke combinations may be extended to object-keystroke combinations. Objects of various types, shapes, sizes, and colors may be utilized in conjunction with finger identification technology to distinguish the tapping finger from all other fingers in a keystroke. For example, a special glove fitted with miniature contact switches or sensors of other types at the fingertips may be used to assist in the identification of a tapping finger. During a keystroke, the data entry device identifies the tapping finger by the corresponding contact switch or sensor being activated. Alternatively, the glove and the switches or sensors may be eliminated if each of the fingers is affixed with tags baring different shapes, sizes, colors, surface texture, or patterns that can be easily identified in a keystroke. Furthermore, the tags can be electronic tags such as radio frequency ID (RFID) tags that are capable of carrying different electronic identifiers. In such cases, the data entry device recognizes the tapping finger in a keystroke by the unique shape, size, color, surface texture, pattern, or identifier of the tag associated with the tapping finger. As another example, ring-shaped objects of different colors, sizes, impedance, conductance, capacitance, or inductance may be worn on the fingers of a typing hand. When a key region has been activated, through the use of contactless sensors, the data entry device can easily differentiate the tapping finger from others by detecting the color, size, impedance, conductance, capacitance, or inductance of the ring worn on the finger. It is readily apparent to one of ordinary skill in art that other objects exhibiting distinguishable, easily detected characteristics and which can be conveniently attached to the fingers may be used in object-keystroke combinations.

Besides assigning different actuating fingers or objects with identifiable features to correspond to symbols or functions associated with keys or key regions, different parts of the same actuating finger or object may be used in the symbol or function assignments. For example, different symbols or functions may be input using the left side and right side of the tip of an index finger, which may be identified though features captured from the contacting finger area or through the tapping orientation. As another example, a stylus in the form of a fork with three differently sized, shaped, or colored tips may be used to select different symbols or functions on a key or key region based on the particular tip used in the key actuation. It is recognized that methods similar to those previously described with reference to FIGS. 11-14 can be applied here to detect the finger or object parts.

Similarly, a portion of an actuating object may have user-configured variable features, and these features can be assigned to correspond to different symbols or functions on a key region, such as on a key. For example, an electronic stylus having three buttons and a light source, such as an LED, embedded at its tip emits light of three different colors, depending on the corresponding button pressed. Each of the colors can be assigned to select a symbol on a multi-symbol key region (such as a main key). Thus, the method previously described previously with reference to FIGS. 11-14 can be applied to select corresponding symbols or functions for input. Examples of other features that can be varied based on user configuration include, but are not limited to, visual features such as colored patterns and displayed picture, impedance, conductance, capacitance, inductance, audibility, and digital data information such as RFID.

The manner in which an object is used to actuate a key region capable of inputting multiple symbols can be used in a further approach to select individual symbols in the key region for input. For example, optical sensors may be used to detect the orientation of a stylus utilized by a user to enter input on a touch screen. During actuation of a key region on the touch screen, a symbol may be entered if the stylus is detected to be in a vertical position nearly perpendicular to the touch screen, while a different symbol may be entered if the stylus is detected to be at an angle, such as approximately 45 degrees, relative to the screen.

Identification of an actuating finger or object may also be accomplished upon user input to a virtual keypad device. In a virtual keypad device, no contact sensors or triggers are present under the keypad area to detect the actuation of key regions (such as those having discrete keys). Instead, contactless sensors such as one or more cameras are utilized for this purpose. Once the actuated virtual key region is determined, the process described previously with reference to FIG. 11 may be applied to determine the corresponding inputted symbol or function based on the combination of actuating finger or object identified and key region actuated.

In virtual input methods, the selected input symbols or functions are determined based on the actuating or tapping finger and the relative location or key region, in two-dimensional or three-dimensional space, where the finger has tapped. For example, in a folded QWERTY layout such as the one shown with device 800 of FIG. 8, the row of keys struck in a particular keystroke is determined by the location where the tapping finger made contact with the typing area relative to a reference location such as the lower left corner of the device, while the particular symbol selected in that row is determined by the tapping finger identified. This combination of finger and tapping location used to determine an input symbol is hereafter referred to as a 'finger-location combination'. With this technique, data may be entered on non-flat surfaces, such as the lap of a user without requiring physical keys. Although the method described above with reference to FIG. 8 illustrates virtual input with one-handed typing on a folded QWERTY keypad layout, it is understood that the method may be applied to two-handed typing on a full QWERTY layout as well.

A brief training period is preferably performed at the beginning of each data entry session to enable the virtual data entry system to take reference measurements in order to adapt to various input environments. To eliminate the need for training and improve the robustness of keystroke identification, guides may selectively be provided to assist the user in establishing a reference location (e.g., the middle row of keys on a conventional keyboard starting with 'ASDF . . . ' on the left) on the 'virtual keypad'. Such locations on a virtual keypad comprising pre-assigned regions having associated input symbols or functions in two-dimensional or three-dimensional space are also referred to as 'virtual key regions'. Guides of various forms, such as one or more lines marked on a surface, may be employed to assist users in visualizing virtual key regions. As another example, one or more lines projected onto a surface from a light source (e.g., a laser) can provide users with visualizations of virtual key regions.

Figure 18:
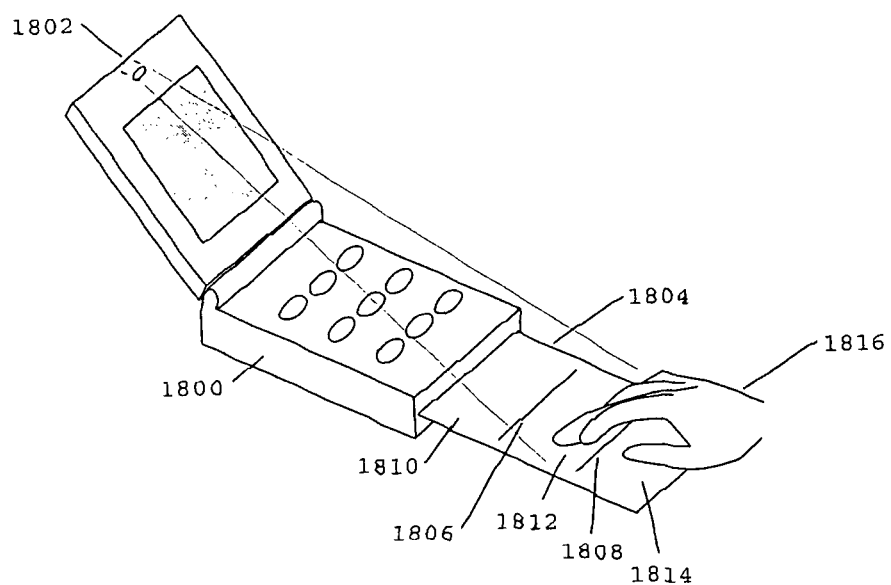
FIG. 18 shows an example of a data entry device having actuating finger identification capabilities and providing a virtual input method.

FIG. 18 illustrates an example embodiment of a data entry device 1800 having sensor 1802 and virtual input capabilities. The data entry device 1800 determines which virtual key region has been actuated. A contactless sensor (such as sensor 1802) is employed to identify a pre-assigned region in which the input object (such as a tapping finger) is situated. The typing surface, or virtual keyboard, in this device is a retractable panel 1804 in the device 1800 that has been extended. As shown in FIG. 18, a series of markings 1806, 1808 (e.g., in the form of horizontal lines) are present on the virtual keyboard 1804 to distinguish between several rows of virtual key regions 1810, 1812, and 1814. The sensor 1802 suited for implementation in this particular data entry device is one of the optical types (e.g., camera) that is capable of continuous, real-time video capture and analysis. The sensor 1802 monitors finger motion to detect keystroke events, which are characterized by an extension of a tapping finger followed by its retraction, resulting in a brief pause when the tapping finger makes contact with the virtual keypad. The sensor 1802 then extracts a graphical image of the keystroke event from the real-time video it captures, and determines the tapping location to identify the key region actuated. The sensor 1802 further detects the tapping finger in the extracted graphical image. An input symbol on the actuated key region is then selected based on the finger-location combination detected. The example depicted in FIG. 18 shows the right middle finger of a hand 1816 of a user tapping the middle key region 1812 on the virtual keyboard 1804. As needed, additional markings may be added to the panel to provide additional virtual key regions.

As previously stated, the markings are primarily provided as guides to assist users in establishing a reference location in a virtual keyboard and visualizing the virtual key regions. Elimination of the markings and a tangible typing surface such as the panel 1804, FIG. 18, enables users to freely type in any location, such as in midair. The movements of the fingers of a typing hand suspended in midair can be processed by an optical sensor capable of continuous, real-time video capture and analysis, similar to the process described with reference to the optical sensor 1802 in FIG. 18.

Virtual input methods can also take a multi-modal approach that utilizes, in addition to optical sensors, one or more sensors of other types, such as electromechanical sensors, to further accurately detect the actuation of virtual key regions and identify the actuating fingers or objects. In these methods, determining the actuation of keys or key regions involves the detection of an actuation event followed by the detection of an actuation location. For example, an acoustic sensor (not shown) may be used in conjunction with optical sensor 1802 in FIG. 18 to detect an actuation of the virtual keyboard 1804 by the hand 1816 of a user. The acoustic sensor may trigger the detection of a key actuation event based on the sounds that result from tapping fingers making contact with the virtual keyboard 1804. As an alternative, the acoustic sensor may be used simultaneously to further confirm the detection of key actuation triggered by the optical sensor 1802. Since different fingers tapping the virtual keyboard 1804 may generate different sounds, the acoustic sensor may also be used to identify the different actuating fingers. In another example, the virtual keyboard 1804 may be coupled to an electromechanical sensor (not shown) capable of sensing vibrations. The vibration sensor can then be used to detect key actuations based on the vibrations generated by tapping fingers making contact with the virtual keyboard 1804. Alternatively, the vibration sensor may be used simultaneously to further confirm the detection of key actuation triggered by the optical sensor 1802. It is apparent from the present description that acoustic sensors and vibration sensors, as well as additional sensors of other types, may be used simultaneously with optical sensors in the detection of keystrokes and identification of actuating fingers.

It will be appreciated that the data input technology described herein may be comprised of one or more conventional processors and unique, stored program instructions that control the one or more processors to implement some, most, or all of the functions of data input described herein; as such, these functions may be interpreted as steps of a method to perform data input. Alternatively, some or all of these functions could be implemented by a state machine that has no stored program instructions, in which each function or some combinations of certain of the functions are implemented as custom logic. Additionally, a combination of these approaches may be used.

While the present invention has been described above in terms of specific embodiments with reference to the accompanying drawings, it is to be understood that the invention is not intended to be confined or limited to those precise embodiments disclosed herein. On the contrary, the present invention is intended to cover various structures and modifications thereof included within the spirit and scope of the appended claims and their equivalents. It should be clearly understood that many variations or modifications of the basic inventive concepts herein taught, which may appear to those skilled in the pertinent art, will still fall within the spirit and scope of the present invention. For example, more main keys can be used to remove the need for a switch between different halves of a QWERTY layout. Many variations of keys, such as scroll wheel, touch key, etc., may be used as the assisting or main keys. Also, various shapes and orientations may be used to define soft boundaries. All such changes and modifications are intended to be included within the scope of the invention.

What is claimed is:

1. A method of determining a user inputted symbol or function at a data entry device comprising:
    associating a group of symbols or a group of functions with each of a single key region from a group of key regions associated with the data entry device;
    assigning to each of the single symbols from the group of symbols or each of the single functions from the group of functions associated with each of the key regions an input object from a group of input objects, each of the input objects being separate from the single key region and moveable from a position outside the single key region to a position inside the single key region to actuate the single key region;
    determining which single key region of the group of key regions that has been actuated by the input object;
    identifying the input object that actuated the key region; and
    outputting the symbol or performing the function in response to the identifying of the input object that actuated the single key region.

2. The method of claim 1 wherein the step of identifying the input object comprises identifying a distinct portion of the input object.

3. The method of claim 1 wherein the step of identifying the input object comprises: identifying user-configurable features exhibited by the input object.

4. The method of claim 1 wherein the input object is selected from the group consisting of: (a) a finger, (b) a portion of a finger, (c) an actuating device, and (d) a part of an actuating device.

5. The method of claim 1 wherein the key regions are selected from the group consisting of: (a) keys of a keyboard, (b) touch-sensitive regions, (c) virtual key regions comprising pre-assigned regions in two-dimensional space, and (d) virtual key regions comprising pre-assigned regions in three-dimensional space.

6. The method of claim 5 further comprising determining which virtual key region has been actuated, in which at least one contactless sensor is utilized to identify a pre-assigned region in which the input object is situated.

7. The method of claim 1 further comprising dividing the key regions by adjustable boundary locations defined by user-configurable program instructions stored in a memory associated with the data entry device.

8. The method of claim 7 wherein the boundary locations are selectively interpreted in response to the identifying of the input object that actuated the key region.

9. The method of claim 7 further comprising adjusting the boundary locations of the key regions based on at least one of: (a) user behavior, (b) spelling correction determinations, and (c) usage frequency of symbols or functions.

10. The method of claim 1 wherein identifying the input object further comprises:
    performing a sample capture, in which the sample contains at least one feature for the identification of the input object;
    performing a pre-processing operation on at least a portion of the captured sample;
    extracting at least one feature of the input object from the captured sample;
    identifying the input object actuating the key region via identification of the extracted feature; and
    selecting the associated symbol or associated function corresponding to the input object identified as actuating the key region.

11. The method of claim 10 wherein the input object further comprises at least one finger or non-finger object, and in which the feature of the input object comprises derived features of at least one of the following types: (a) size, (b) shape in two- or three-dimensional space, (c) edge, (d) color, (e) surface texture, (f) size of contact area with actuated key region, (g) pressure or impact of contact with actuated key region, (h) sound of contact with actuated key region (i) impedance, (j) conductance, (k) capacitance, (l) inductance, (m) infrared properties, (n) ultrasound properties, (o) thermal properties, (p) finger vein pattern, (q) fingerprint, and (r) a derivative of one or more of (a)-(q).

12. The method of claim 1 wherein the step of assigning further comprising:
    placing an identifiable differentiating object on each input object; and
    assigning the group of symbols or the group of functions to the identifiable differentiating objects.

13. The method of claim 12 wherein the identifiable differentiating object is selected from the group consisting of: (a) sensors, (b) gloves, (c) rings, (d) switches, (e) tags, and (f) a derivation of one or more of (a)-(e).

14. The method of claim 1 further comprising providing at least one sensor to identify the input object, the at least one sensor being selected from the group consisting of: (a) contact sensors, (b) contactless sensors, (c) active sensors, and (d) hybrid sensors of two or more of (a)-(c).

15. The method of claim 14 wherein the contactless sensor is a camera.

16. The method of claim 1 wherein the step of identifying further comprises:
    providing an active sensor projecting reference signals onto the input object and detecting feedback from the projecting reference signals.

17. The method of claim 16 wherein the reference signals are selected from the group consisting of: (a) electromagnetic wave signals, and (b) ultrasound signals.

18. The method of claim 1 further comprising:
    associating one or more assisting keys with each of a group of symbols or each of a group of functions associated with each of a single key region from a group of key regions.

19. The method of claim 1 further comprising a keyboard having a layout selected from the group consisting of (a) an alphabetic layout with letter symbols arranged in alphabetical order from left to right within rows of the keys in said layout, and (b) a telephone-style layout.

20. The method of claim 1 further comprising a keyboard having a layout selected from the group consisting of: (a) a folded QWERTY layout, in which the group of symbols or group of functions comprise a pair of symbols or functions from opposite halves of a standard QWERTY keyboard divided by, and symmetrical about, the following pairs of symbols: '5' and '6', 'T' and 'Y', 'G' and 'H', and 'B y and 'N', (b) a compressed QWERTY layout, in which the plurality symbols or functions associated with said layout comprise a pair of symbols or functions adjacent to each other on a standard QWERTY layout, and (c) a standard QWERTY layout.

21. The method of claim 1 wherein the group of input objects comprises one or more objects.

22. The method of claim 1 wherein the group of input objects comprises two objects or more.

23. The method of claim 22 wherein the group of input objects is selected from the group consisting of: fingers, non-finger objects and a combination of finger and non-finger objects.

24. The method of claim 1 wherein the input object comprises the combination of two fingers.

25. An apparatus for determining a user inputted symbol or function comprising:
    a data entry device having a memory unit to store information associating a group of symbols or a group of functions with each of a single key region from a group of key regions, the key regions being associated with the data entry device, wherein an input object from a group of input objects is assigned to each symbol of the group of symbols or each function of the group of functions, each of the input objects being separate from the single key region and moveable from a position outside the single key region to a position inside the single key region to actuate the single key region; and
    a processor of the data entry device adapted to: (i) determine the single key region actuated by the input object, (ii) identify the input object that actuated the single key region, and (iii) the symbol or performing the function associated with the single key region and assigned to the input object.

26. The apparatus of claim 25 further comprising user-configurable program instructions stored in the memory unit for assigning each of a single symbol from the group of symbols or each of the single function from the group of functions to distinct portions of the input object or each of the single function from the groups of functions to distinct portions of the input object.

27. The apparatus of claim 25 further comprising user-configurable program instructions stored in the memory unit for assigning each of a single symbol from the groups of symbols or each of a single function from the groups of functions to user-configured features exhibited by the input object.

28. The apparatus of claim 25 wherein each of the input objects is selected from the group consisting of: (a) a finger, (b) a combination of fingers, (c) a portion of a finger, (d) an actuating device, and (e) a part of an actuating device.

29. The apparatus of claim 25 wherein the key regions further comprise at least one of: (a) keys of a keyboard, (b) touch-sensitive regions, (c) virtual key regions comprising pre-assigned regions in two-dimensional space, and (d) virtual key regions comprising pre-assigned regions in three-dimensional space.

30. The apparatus of claim 29 wherein the data entry device further comprises a member to determine which virtual key region that has been actuated and further comprising at least one contactless sensor to identify a pre-assigned region in which the input object is situated.

31. The apparatus of claim 25 further comprising adjustable boundary locations that divide the plurality of key regions into individual key regions, the boundary locations defined by user-configurable program instructions stored in the memory unit and selectively interpreted in response to the identification of the input object set that actuated the key region.

32. The apparatus of claim 31 wherein the processor is adapted to adjust the boundary locations of the key regions based on at least one of: (a) user behavior, (b) spelling correction determinations, and (c) usage frequency of symbols or functions.

33. The apparatus of claim 25 further comprising user configured program instructions stored in the memory unit for assigning each of a single symbol from the group of symbols or each of a single function from the group of functions to identifiable differentiating objects that are placeable on each of the input objects.

34. The apparatus of claim 33 wherein the identifiable differentiating object is selected from the group consisting of: (a) sensors, (b) gloves, (c) rings, (d) switches, (e) tags, and (f) a derivation of one or more of (a)-(e).

35. The apparatus of claim 25 further comprising at least one sensor coupled with the processor to identify the input object that actuated the key region, in which said sensor is selected from the group consisting of: (a) contact sensors, (b) contactless sensors, (c) active sensors, and (d) hybrid sensors of two or more of (a)-(c).

36. The apparatus of claim 35 wherein the contactless sensor is a camera.

37. The apparatus of claim 25 further comprising at least one active sensor coupled with the processor to identify the input object that actuated the key region, wherein the at least one active sensor detects the input object by projecting reference signals onto the input object and detecting feedback from the projected reference signals.

38. The apparatus of claim 37, wherein the reference signals comprise at least one of: (a) electromagnetic wave signals, and (b) ultrasound signals.

39. The apparatus of claim 25 further comprising at least one assisting key associated with the data entry device wherein a combined actuation of the key region and assisting key, in conjunction with the input object associated with the key region actuation, identifies the associated symbol or function to be outputted or performed.

40. The apparatus of claim 25 further comprising a keyboard having a layout selected from the group consisting of: (a) an alphabetic layout having letter symbols arranged in alphabetical order from left to right within rows of keys in said layout, and (b) a telephone-style layout.

41. The apparatus of claim 25 further comprising a keyboard having a layout selected from the group consisting of: (a) a folded QWERTY layout, in which the plurality of symbols or functions associated with said layout comprise a pair of symbols or functions from opposite halves of a standard QWERTY keyboard divided by, and symmetrical about, the following pairs of symbols: '5' and '6', 'T' and 'Y', 'G' and 'H', and 'By and 'N', (b) a compressed QWERTY layout, in which the plurality symbols or functions associated with said layout comprise a pair of symbols or functions adjacent to each other on a standard QWERTY layout, and (c) a standard QWERTY layout.

* * * * *

UNITED STATES PATENT AND TRADEMARK OFFICE
CERTIFICATE OF CORRECTION

PATENT NO. : 9,274,551 B2  
APPLICATION NO. : 11/361858  
DATED : March 1, 2016  
INVENTOR(S) : Wei Ling Su et al.

Page 1 of 1

It is certified that error appears in the above-identified patent and that said Letters Patent is hereby corrected as shown below:

In the Claims

In column 28, line 18, in claim 19, please delete "of" and insert --of:-- therefor;

In column 28, line 28, in claim 20, delete "'By" and insert --'B'-- therefor;

In column 28, line 61, in claim 25, delete "(iii)" and insert --(iii) outputting-- therefor;

In column 30, line 39, in claim 41, delete "'By" and insert --'B'-- therefor.

Signed and Sealed this  
Nineteenth Day of July, 2016

Michelle K. Lee  
*Director of the United States Patent and Trademark Office*